United States Patent [19]
Brown

[11] Patent Number: 6,144,292
[45] Date of Patent: *Nov. 7, 2000

[54] POWERLINE COMMUNICATIONS NETWORK EMPLOYING TDMA, FDMA AND/OR CDMA

[75] Inventor: Paul A. Brown, Cumbria, United Kingdom

[73] Assignee: Norweb PLC, United Kingdom

[*] Notice: This patent is subject to a terminal disclaimer.

[21] Appl. No.: 08/727,530
[22] PCT Filed: Apr. 20, 1995
[86] PCT No.: PCT/GB95/00894
  § 371 Date: Dec. 9, 1996
  § 102(e) Date: Dec. 9, 1996
[87] PCT Pub. No.: WO95/29537
  PCT Pub. Date: Nov. 2, 1995

Related U.S. Application Data

[63] Continuation-in-part of application No. 08/347,427, filed as application No. PCT/GB93/02163, Oct. 20, 1993, Pat. No. 5,684,450.

[30] Foreign Application Priority Data

Oct. 22, 1992 [GB] United Kingdom .................. 9222205
Apr. 21, 1994 [GB] United Kingdom .................. 9407934

[51] Int. Cl.⁷ .................................................. H04M 11/00
[52] U.S. Cl. ............................... 340/310.02; 340/310.03; 340/310.07; 370/466; 370/478; 370/479
[58] Field of Search ..................................... 370/280, 281, 370/294, 295, 335, 337, 342, 344, 343, 345, 347, 436, 441, 442, 466, 478, 479; 455/3.1, 3.3, 402; 340/310.01, 310.05, 310.06, 310.02, 310.03, 310.04, 310.07, 310.08

[56] References Cited

U.S. PATENT DOCUMENTS 1,547,242  7/1925  Strieby .
2,577,731  12/1951  Berger ..................................... 455/402
3,696,383  10/1972  Oishi et al. ............................. 340/310

(List continued on next page.)

FOREIGN PATENT DOCUMENTS 0141673  5/1985  European Pat. Off. .......... H04B 3/56
2326087  4/1977  France ............................. H04B 3/54
1548652  7/1979  United Kingdom ............. H04B 3/54

(List continued on next page.)

OTHER PUBLICATIONS

J. Gohari, "Power-Line Carrier," *Fundamentals Handbook of Electrical and Computer Engineering, vol. II, Communication, Control. Devices, and Systems*, (Sheldon S. L. Chang, editor), John Wiley & Sons, New York, 1983, pp. 617–627.

Informal English translation of French Application No. 7621599 corresponding to French Patent 2,326,087 (Zellweger Uster S.A.).

Keith Nichols, "Build a Pair of Line–Carrier Modems," *Radio Electronics*, pp. 87–91, (Jul. 1988).

(List continued on next page.)

*Primary Examiner*—Ricky Ngo
*Attorney, Agent, or Firm*—Howrey Simon Arnold & White, LLP

[57] ABSTRACT

A communications apparatus is adapted for use with a mains electricity transmission and/or distribution network. The communications apparatus includes a signal transmission and/or reception means, and frequency conversion means for converting the frequency of a signal transmitted or received by the signal transmission and/or reception means to a frequency which facilitates improved propagation of the signal on the network. Preferably the signal transmission and/or reception means is adapted to operate according to a telephony standard with uses a relatively high carrier frequency (e.g. CT2), and the frequency conversion means is usable to covert a signal having a relatively high carrier frequency (e.g. CT2) and the frequency conversion means is usable to convert a signal having a relatively high carrier frequency to a signal having a lower carrier frequency.

25 Claims, 22 Drawing Sheets

U.S. PATENT DOCUMENTS

| | | | |
|---|---|---|---|
| 3,846,638 | 11/1974 | Wetherell | 307/3 |
| 3,942,170 | 3/1976 | Whyte | 340/310 A |
| 3,993,989 | 11/1976 | Held et al. | 340/310 R |
| 4,142,178 | 2/1979 | Whyte et al. | 340/310 R |
| 4,359,644 | 11/1982 | Foord | 307/40 |
| 4,367,522 | 1/1983 | Forstbauer et al. | 363/137 |
| 4,383,243 | 5/1983 | Krügel et al. | 340/310 |
| 4,409,542 | 10/1983 | Becker et al. | 324/57 |
| 4,419,621 | 12/1983 | Becker et al. | 324/51 |
| 4,471,399 | 9/1984 | Udren | 361/64 |
| 4,475,209 | 10/1984 | Udren | 375/4 |
| 4,479,033 | 10/1984 | Brown et al. | 179/2.51 |
| 4,517,548 | 5/1985 | Ise et al. | 340/310 R |
| 4,701,945 | 10/1987 | Pedigo | 379/66 |
| 4,766,414 | 8/1988 | Shuey | 340/310 A |
| 4,772,870 | 9/1988 | Reyes | 340/310 |
| 4,912,553 | 3/1990 | Pal et al. | 358/86 |
| 5,066,939 | 11/1991 | Mansfield, Jr. | 455/402 |
| 5,068,890 | 11/1991 | Nilssen | 379/90 |
| 5,148,144 | 9/1992 | Sutterlin et al. | 340/310 A |
| 5,319,634 | 6/1994 | Bartholomew et al. | 370/441 |
| 5,406,249 | 4/1995 | Pettus | 340/310.08 |
| 5,477,091 | 12/1995 | Fiorina et al. | 307/66 |
| 5,497,142 | 3/1996 | Chaffanjon | 340/310.06 |
| 5,559,377 | 9/1996 | Abraham | 379/66 |
| 5,684,450 | 11/1997 | Brown | 340/310.02 |
| 5,717,685 | 2/1998 | Abraham | 370/30 |

FOREIGN PATENT DOCUMENTS

| | | | |
|---|---|---|---|
| 2101857 | 1/1993 | United Kingdom | H04B 3/56 |
| 2272350 | 5/1994 | United Kingdom | H04B 3/56 |
| WO84/01481 | 4/1984 | WIPO | H04B 3/54 |
| WO90/13950 | 11/1990 | WIPO | H04B 1/50 |
| WO92/16920 | 1/1992 | WIPO | H04B 3/54 |
| WO93/07693 | 4/1993 | WIPO | H04J 13/00 |
| WO93/23928 | 11/1993 | WIPO | H04B 1/38 |
| WO 94/09572 | 4/1994 | WIPO | H04B 3/54 |
| WO94/09572 | 4/1994 | WIPO | H04B 3/54 |

OTHER PUBLICATIONS

JP62120735, Patent Abstracts of Japan, vol. 11 No. 341 (E–554) Jun. 2, 1987, Kaoruet al., Method and Apparatus for Frequency Hopping Stread Spectrum Power Line Carrier Communication, 1 page.

JP62030428, Patent Abstracts of Japan, vol. 11 No. 209 (E–521) Feb. 9, 1987, Kondo Tomio, Current Superposition Type High Frequency Circuit, 1 page.

JP1276933, Patent Abstracts of Japan, vol. 14, No. 51 (E–0881) Jan. 30, 1990, Uchida Hiroshi, Transformer Bypass Circuit, 1 page.

J. R. Formby and R. N. Adams, "The Mains Network As A High Frequency Signalling Medium," The Electricity Council, Jan. 1970.

J. M. Barstow, "A Carrier Telephone System for Rural Service," AIEE Transactions, vol. 66, 1947, pp. 501–507.

I. C. Vercellotti & I. A. White, "Distribution Power Line Communications for Remote Meter Reading and Selective Load Control," Proceedings of the American Power Conference 1974, vol. 36, pp. 1114–1119.

B. Ron Russell, editor, "Communication Alternatives for Distribution Metering and Load Management," Record of Panel Presentations, 1979 Summer Power Meetings, IEEE Transactions on Power Apparatus and Systems, vol. PAS–99, No. 4, Jul./Aug. 1980, IEEE, New York, NY, pp. 1448–1455.

Glen Lokken et al., "The Proposed Wisconsin Electric Power Company Load Management System," 1976 Nat. Telecomm. Conf., Dallas, Texas, Nov. 1976, IEEE, New York, NY, pp. 2.2–1 to 2.2–3.

J. H. Bull et al., "A Survey of Mains Signalling Within the UK," ERA Report No. 86–0038, ERA Technology Limited, Surrey, England, Apr. 1986, pp. 1–52, AA.2–AA.5, FIGS. 1–33, Table I.

British Standards, "Signalling on low–voltage electrical installations in the frequency range 3 KHz to 148.5 KHz, BS EN|50065–1, 1992 (2 pages); Electromagnetic compatibility—Generic emission standard," BS EN 50081–1 (2 pages); "Telecontrol equipment and systems,"to BX 7407 (870–1–1) (1 page).

Draft standard, "Signalling on Low–Voltage Electrical Installations in the Frequency Band 3 kKz to 148.5 kHz, Part 4: Filters at the interface of the indoor and outdoor electricity network," EN 50 065–4 Apr. 1992 (11 pages).

Draft standard, Signalling on Low–Voltage Electrical Installations in the Frequency Band 3 kKz to 148.5 kHz, Part 7: Equipment Impedance, EN 50 065–7 Apr. 1992 (3 pages).

"Coaxial Feeder Cables," Engineering Notes, Publication Ref. No. TSP507/1, Pye Telecommunications Limited, Cambridge, England, Jun. 1975, pp. 1–13.

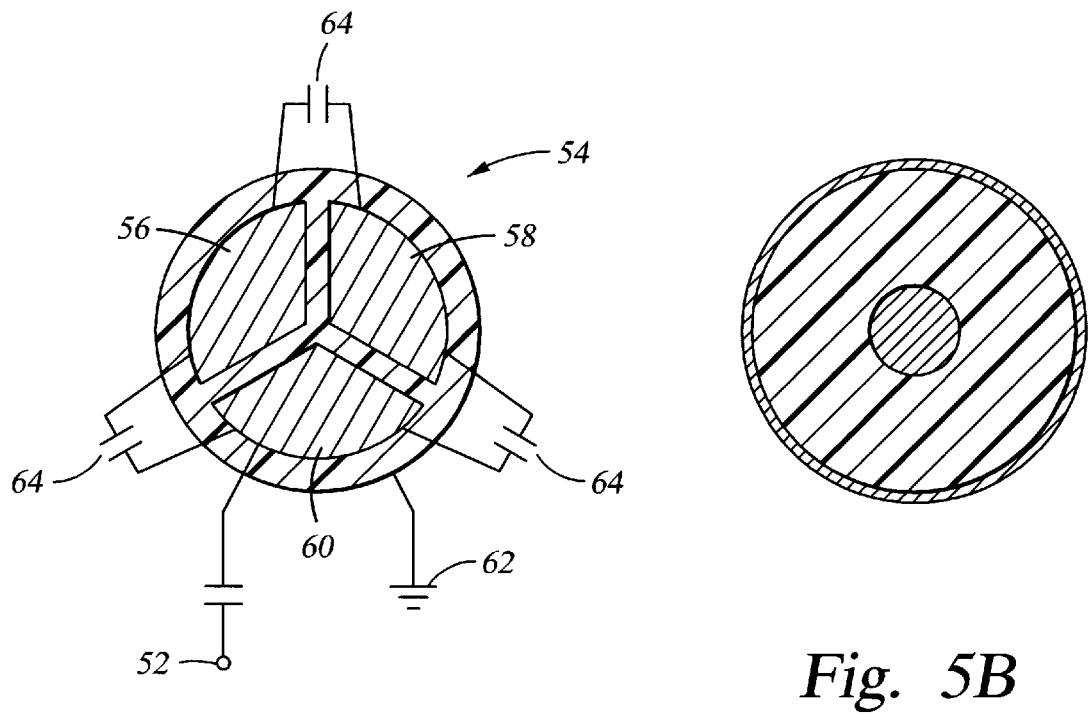
Fig. 5A
Fig. 5B
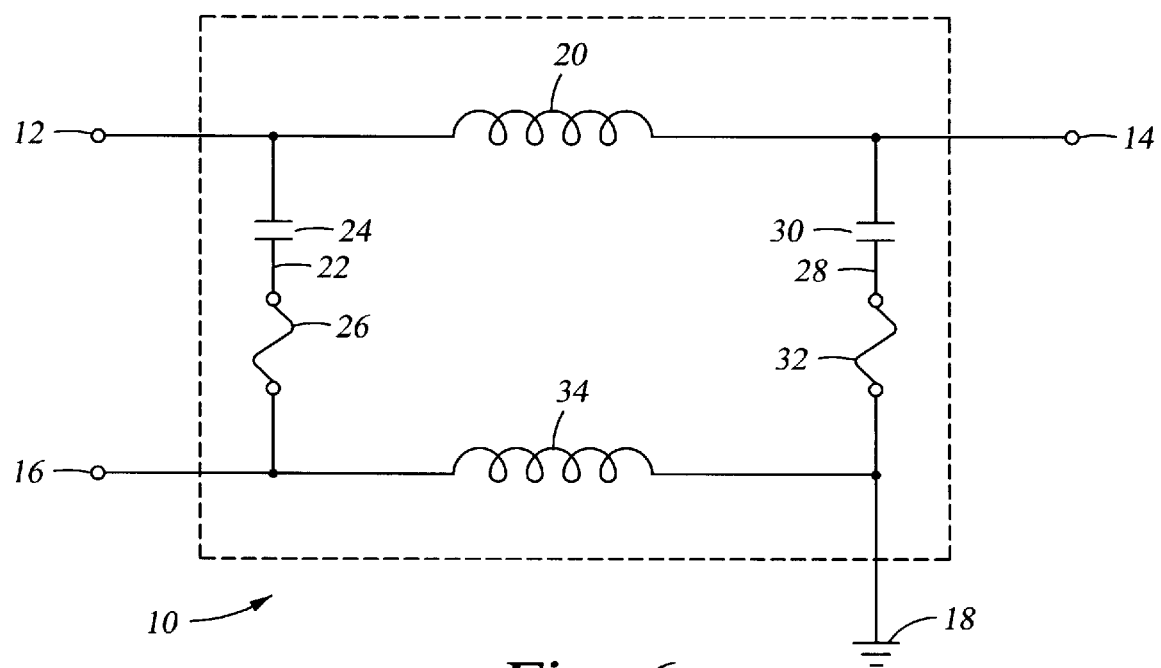
Fig. 6

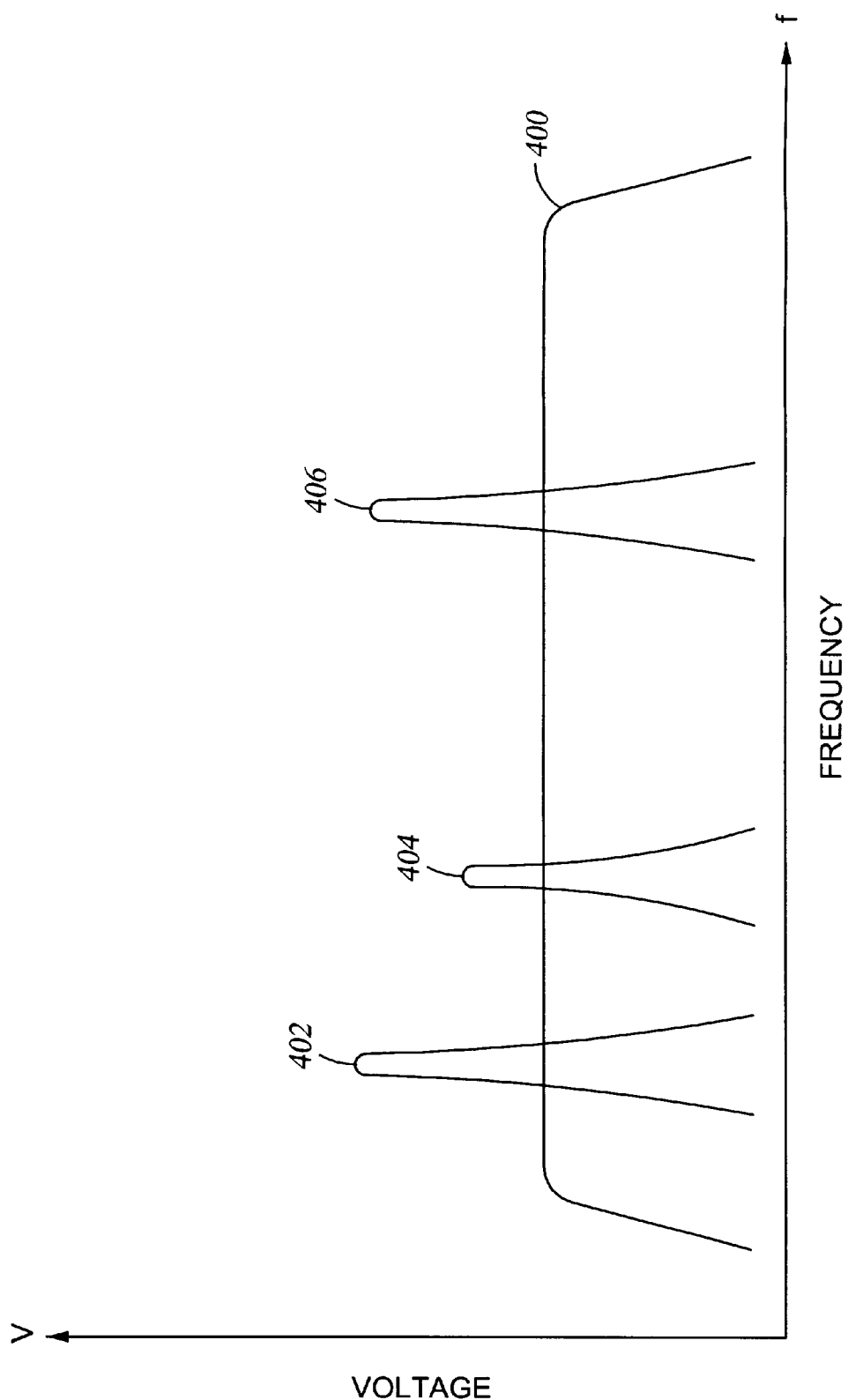

POWERLINE COMMUNICATIONS NETWORK EMPLOYING TDMA, FDMA AND/OR CDMA

RELATED APPLICATIONS

This application is a continuation-in-part of U.S. Ser. No. 08/347,427 filed Nov. 29, 1994 by Paul A. Brown, issued on Nov. 4, 1997 as U.S. Pat. No. 5,684,450. U.S. Ser. No. 08/347,427 is the U.S. national phase of International Application No. PCT/GB93/02163 filed Oct. 20, 1993, published Apr. 28, 1994 as WO 94/09572 under the title "Transmission Network and Filter Therefor," and claiming priority of GB 9222205.8 filed Oct. 22, 1992.

This application includes subject matter related to U.S. Ser. No. 08/727,505 filed Jan. 17, 1997 by Paul A. Brown, which is the U.S. national phase of International Application No. PCT/GB95/00893 as filed on Apr. 20, 1995, published Nov. 2, 1995 as WO 95/29536 under Paul A. Brown Ser. No. 08/727,530.

This invention relates to a method of signal injection, transmission, interconnection (termination) and detection, and to a power transmission network, ie. a mains electricity distribution and/or transmission network, and a filter therefor. In particular it relates to the use of mains electricity networks and/or lines for telecommunications transmission (e.g. voice, data, image and/or video).

In the UK, it is conventional to describe a power network for 33 kV and above as a "transmission network", and one for less than 33 kV as a "distribution network". In this specification the term "electricity distribution and/or power transmission network" is normally used, but general references to power networks and to transmission of signals are to be construed as applying to all such networks.

Traditionally telecommunications signals have been transmitted on independent networks e.g. telephone lines. More recently, in order to simplify and increase efficiency of telecommunications services to domestic or industrial premises, there have been investigations into using existing electricity transmission and distribution networks to carry telecommunications services.

It has been known to utilise above ground (overhead) power lines for the transmission of additional control, speech and data signals. However, with such transmissions, the frequency spectrum must be allocated for and restricted to particular applications in order to avoid interference with other telecommunications services. In addition, the strength of signals which can be transmitted is limited since the amount of radiation produced by the transmission is related to the strength of the signal and this radiation must be kept to a minimum.

Such transmission signals must therefore be of low power and confined within a specific frequency band allocated by international agreement for such purposes, so this mechanism is unsuitable for large scale voice and/or data transmission where signals extend well into the radio spectrum (e.g. 150 kHz and above).

It has been known to use spread spectrum techniques to transmit data at carrier frequencies of between 6 kHz and 148 kHz on underground and overhead power networks. Again, in this allocated frequency band such transmissions suffer from low data rates and low traffic capacities due to power line noise characteristics. Due to the limited spectrum available and high noise levels encountered wideband telecommunications signals cannot be sent.

Although papers such as that by J. R. Formby and R. N. Adams, ("The mains network as a high frequency signalling medium", The Electricity Council, January 1970) suggested a communications potential for the low and medium voltage networks, no further work was undertaken. Even today, with the prospect of remote meter reading and selective load control, solutions tend to employ techniques such as telephony and radio communications, thus avoiding the mains network where possible.

Ideas have been put forward but few have proceeded past the theoretical stage, due to the hostile environment presented by the mains network. The problems to overcome include electrical noise, (both constant background noise and transient spikes) and high attenuation of high frequency signals due to skin and proximity effects. Messrs Formby and Adams suggested using frequencies in the range of 80 to 100 kHz. 100 kHz was recommended as a maximum because theory suggested that higher frequencies would suffer from excessive attenuation. Other papers recommend a maximum of 150 kHz due to the fact that radiated signals higher than 150 kHz would interfere with broadcast radio signals.

A further situation where power lines are also used for the transmission of speech and data signals is on the electricity wiring inside buildings. In such configurations the internal 240V mains wiring is used for the transmission of data, with appropriate filtering being provided to add and separate the data signals from the power signals. Additionally a filter, such as the Emlux filter described in European Patent Application 141673, may be provided to prevent data signals leaving the building and entering the power supply network external to the building. The Emlux filter described consists of a tuned ferrite ring which acts effectively as a band stop filter. In order to be effective the band stop filter must be of narrow bandwidth and therefore is not suitable for use with high speed data communications, since a large number of such band stop filters would be required.

A further problem with sending telecommunications signals on a mains power network lies in the determination of a suitable technique or protocol for the transmission of those signals. As power networks are typically "trunk and branch multipoint" and/or "point to multipoint" networks there may be many different propagation paths and reflection points as a signal is transmitted along the network. This results in what is known as "delay spread" of the signal, that is the signal becomes spread out in time as it takes different propagation paths through the network. A typical delay spread may be around 5 $\mu$s, and this must be taken into account when determining the data transmission rate.

SUMMARY OF THE INVENTION

The present invention aims to provide a transmission network which alleviates some or all of the above problems.

Accordingly, in a first aspect, the present invention provides an electricity distribution and/or power transmission network at least part of which is external to a building, the network including input means for the input onto the network of a telecommunications signal having a carrier frequency greater than approximately MHz and output means for removing said telecommunications signal from the network, said signal being transmissible along said external part of the network, wherein the network is adapted to transmit said signal using frequency, time and/or code division multiplexing techniques.

A wide range of different transmission techniques are available for use with electricity power line communication each using various modulation methods including frequency, time and code division multiplexing. It has been determined that the spread spectrum method offers inherent security and good interference rejection characteristics. These properties are achieved using a large bandwidth and hence requires the design of a specific filter.

Modulation methods include amplitude, frequency, phase; single, double and vestigal sideband, pulse position, width and amplitude; frequency shift keying (FSK), Gaussian filtered FSK (GFSK), Gaussian minimum shift keying (GMSK), Quaternary phase shift keying (QPSK), Orthogonal quaternary phase shift keying (OQPSK), Quadrature amplitude modulation (QAM), Pi/4 QPSK etc.

A large number of standard cordless, mobile and cellular radio phone communication techniques may be suitable for effecting signal transmission over a conditioned network.

Preferably, the network is adapted to transmit said signal using one or more of the following cordless telephony techniques and/or standards: CT0, CT1 and CT2, AMPS, DECT (Digital European Cordless Telephone Standard), IS-54, IS-95, GSM, Q-CDMA,R-CDMA, UD-PCS, PHS, PACS, TACS, ENTACS, NMT450, NMT900, C-450, RTMS, Radicom 2000, NTJ, JTACS & NTACS, DCS 1800, etc.

One particularly favourable telecommunications standard has been found to be the CT2 standard. However in normal use, CT2 equipment transmits and receives at a radio frequency of around 866 MHz. Accordingly, the network may include frequency conversion means for down converting the frequency of the signal to a frequency more suited for propagation on the network.

CT2 is a digital transmission standard and applying such a standard permits the signals to be frequency translated and regenerated at requisite points on the network thus extending the services to any or all sections of a network irrespective of the overall attenuation offered by the network end to end.

One possible problem with using the CT2 standard is that the CT2 signal is prone to interference by noise. One way round this problem is to use a different standard, namely the CDMA (Code Division Multiple Access) spread spectrum transmission techniques.

With CDMA, the signal is spread across the frequency spectrum and therefore interference at any particular frequency does not necessarily effect the effectiveness of the data transmission included in the signal. Furthermore, as the signal is spread across the spectrum then less power is needed to transmit the signal.

Advantageously, the present invention may make further use of this property of CDMA transmission. Accordingly, signals of a relatively narrow bandwidth may be superimposed over the relatively broad bandwidth CDMA signal. The narrow bandwidth signal(s) will interfere with the CDMA signal at the particular frequency of the narrow bandwidth signal, but the CDMA signal will remain undisturbed in other parts of its frequency range. Thus deliberate "interference" can be added to the CDMA signal. This could be used for, for example, transmitting narrow bandwidth data signals on top of a relatively broad bandwidth telephony signal.

The term "carrier frequency" refers to the unmodulated frequency of the carrier signal, and not to the frequency of the telecommunications signal once modulated.

On, for example, a 415V network the carrier frequency may preferably be between 1–10 MHz, and on, eg., a 11 kV network may be between e.g. 1–20 MHz, or possibly 5–60 MHz. However the frequency may be up to 100's of MHZ depending on the network and the application. For example, over short distances (10–20 m) a frequency range of e.g. 1–600 MHz or 1–800 MHz may be used.

The power network may include one or more phases. Preferably the network is a polyphase network including e.g. any one or more of 2, 3, 4, 5, 6, 7 etc phases. Different sections of the network may include different numbers of phases.

The network may typically be a trunk and branch multipoint (or multipoint to point) electricity distribution and/or power transmission network.

Preferably the network is unbalanced i.e. provides unbalanced transmission characteristics. The cable(s) of the network may be screened or clad e.g. with a suitable metal material, which enables the cable to behave as a pseudocoaxial element to provide an unbalanced transmission network at the transmission frequency of the present invention.

Preferably the transmission network is external to any building or premises such as an office or house. Inside such buildings, transmission distances are typically short and therefore attenuation losses relatively unimportant.

Preferably the power network is a major (e.g. overground and/or underground) power network including e.g. any or all of 132 kV, 33 kV, 11 kV, 415V and 240V sections. The voice and data signals may be transmitted over any or all of the sections of the power network by suitable detection, amplification and/or regeneration and reintroduction as and when necessary.

In a preferred embodiment, full duplex facilities are provided by utilising, for example, frequency (FDD), time (TDD) and/or code division multiplexing and/or multiple access (CDMA) techniques,i.e. signals may be transmitted and/or received in all directions simultaneously.

A network according to the present invention may be used for many speech and/or data transmission purposes, such as remote reading of electricity meters, remote banking and shopping, energy management systems, telephony (voice), switched telephony, security systems and/or interactive data services, multimedia services and television.

According to a further aspect, the present invention provides communications apparatus adapted for use with a mains electricity transmission and/or distribution network, including signal transmission and/or reception means, and frequency conversion means for converting the frequency of a signal transmitted or received by signal transmission and/or reception means to a frequency which facilitates improved propagation of the signal on the network.

Preferably, the signal transmission and/or reception means is adapted to operate according to a telephony standard which uses a relatively high carrier frequency (e.g. 500 MHz–1 GHz), and said frequency conversion means is usable to convert a signal having a relatively high carrier frequency to a signal having a lower carrier frequency (e.g. 1–60 MHz).

In a preferred embodiment, the signal transmission and/or reception means is adapted to operate according to the CT2or CDMA standards. Preferably the frequency conversion means is usable to convert the carrier frequency of the signal to between 1 and 20 MHz.

Typically, the signal transmission and/or reception means may comprise telephony equipment e.g. a telephone or fax machine.

According to a further aspect, the present invention provides a method of signal transmission including input of a telecommunications signal having a carrier frequency of greater than approximately 1 MHz onto an electricity power distribution and/or transmission network at least part of which is external to a building and subsequent reception of the signal, said signal being transmitted along said external part of the network, wherein said signal is transmitted using frequency, time and/or code division multiplexing techniques.

In a further aspect, the present invention provides a communications apparatus (known hereinafter as a "network conditioning unit") for use with a network according to the first aspect of the present invention. The network conditioning unit includes a low pass filter portion or portions for filtering out the low frequency high amplitude mains power signal i.e. separating it from the telecommunications signal(s) and allowing it to pass through the conditioning unit. The unit also includes a high pass coupling element for input and removal of telecommunications signals from the network and, preferably, a terminating element of similar impedance to the characteristic impedance of the network at that point.

The use of such a unit ensures that the high frequency telecommunications signals do not contaminate the internal low voltage wiring present inside a premises, and/or that noise sources from the internal low voltage premises wiring do not contaminate or corrupt the high frequency telecommunications signals being transmitted over the external electricity transmission and/or distribution network.

Preferably, the variable electrical loading effects (i.e. the load impedances) of all items which are coupled onto the network from time to time and which utilise electrical energy (i.e. the electrical loads) are isolated from the communications signals by the action of low pass filter element (s) of the conditioning unit(s).

Preferably an electrical filter is used at the interface between the external distribution network and the internal network of the premises, e.g. a house, of a user to ensure that the two signals are separated. Such a filter should have minimal effect on the normal domestic electricity supply.

The filter element of the present invention, which aims to reduce telecommunications signals entering the internal network of a users premises, preferably has no more than 1 volt dropped across it whilst supplying a 100 amp load from a 240v, 50 Hz, single phase source.

Preferably the network conditioning unit provides impedance matching between reception/transmission devices and the power network. Additionally the network conditioning unit may carry full load or fault current at power frequencies whilst still carrying the voice and data signals.

In a third aspect, the present invention provides a method of signal transmission using a network as described herein.

Where signals are being transmitted along a polyphase (e.g. three phase) electricity power cable, the signal propagation may be between any or all of the phases and ground. In a preferred embodiment the signal is injected between only one of the phases and ground, which also provides unbalanced transmission characteristics and the cable behaves as a pseudo coaxial transmission line.

Where signals are being transmitted along a single phase electricity distribution service cable a pseudo-coaxial effect may also be obtained. Single phase cables may typically be either concentric or split-concentric. In the case of a split-concentric cable, means (such as a capacitive coupling between the parts of the split-concentric sheath) may be provided so that at the desired frequency the cable behaves as a standard concentric cable. Thus a pseudo-coaxial effect is achievable and the cable provides an unbalanced transmission characteristic.

The network conditioning unit preferably includes a low pass filter comprising a main inductor arranged between a mains electricity input and a mains electricity output and connected at each end thereof to a signal input/output line which is arranged in parallel to the mains electricity input and mains electricity output, the two connections including a first capacitor and a second capacitor each of a predetermined capacitance depending upon the portion of the frequency spectrum which is to be utilised for communications purposes.

In this arrangement the main inductor is operative to prevent communications signals from the signal input/output line from entering the domestic/industrial premises. This inductor is therefore preferably of a high inductance such as 10 $\mu$H to 200 $\mu$H for frequencies of 1 MHz and above.

The first capacitor which connects the mains electricity input and the signal input/output line acts as a coupling capacitor to allow communication signals through from the signal input/output line whilst attenuating all low frequency components at or about the main electricity supply frequency (ie., 50/60 Hz).

The second capacitor arranged between the mains electricity output and the signal input/output line provides a further attenuation of communication signals and is connected via the signal input/output line to ground.

In the event of failure of either the first or second capacitor each such capacitor is preferably provided with a respective fuse arranged between the first or second capacitor and the signal input/output line. Furthermore an additional safety precaution can be incorporated by provision of a second inductor arranged between the connections between the signal input/output line and the first and second capacitors. This inductor has no effect on communication frequency signals but will provide a path to ground if the first capacitor develops a fault, thereby allowing the first fuse to blow without allowing the power frequency signal onto the signal input/output line.

The inductance of the main inductor depends upon the material of which it is made and the cross-section of the wire wound around the core. The 10 $\mu$H inductance previously specified is preferably a minimum and with use of better core material a higher inductance, for example of the order of 200 $\mu$H, can be obtained. Alternatively, a number of inductors connected in series could be used.

The coupling capacitor has a capacitance preferably in the range 0.01 to 0.50 $\mu$F and the second capacitor linking the mains electricity output with the signal input/output line and ground has a capacitance preferably in the range of 0.001 to 0.50 $\mu$F.

The second inductor arranged on the signal input/output line preferably has a minimum inductance of approximately 250 $\mu$H. This inductor therefore has no effect on communication frequency signals on the signal input/output line. The conductor used to construct the 250 $\mu$H inductor should be of sufficient cross-sectioned area to take fault current should the decoupling capacitor fail to short circuit condition.

Preferably, any spurious self resonance in the inductive or capacitive elements are avoided. As the lower cut off frequency of the conditioning unit is increased the minimum values of inductance and capacitance may be proportionally reduced.

In a preferred embodiment the filter is assembled in a screened box so as to provide a good earth and prevent radiation of the communication signals.

In a further aspect, the present invention provides an electricity distribution and/or power transmission network having a number of phases, said number being chosen from the list 1,2,4,5,6,7,8,9, . . . n (where n is an integer greater than 9), but preferably having 1 or 2 phases, and including input means for the input of a telecommunications signal having a carrier frequency greater than approximately 1 MHz onto at least one of the phase conductors of the network and output means for removing said telecommunications signal from at least one other phase conductor of the network.

In a further aspect, the present invention provides an unbalanced electricity distribution and/or power transmission network at least a part of which comprises a clad cable, the network including input means for the input onto the network of a telecommunications signal having a carrier frequency greater than approximately 1 MHz and output means for removing said telecommunications signal from the network, said signal being transmissible along said part of the network having clad cable.

In a further aspect, the present invention provides a trunk and branch multipoint electricity distribution and/or power transmission network including input means for the input onto the network of a telecommunications signal having a carrier frequency greater than approximately 1 MHz and output means for removing said telecommunications signal from the network.

In a further aspect the present invention provides an electricity distribution and/or power transmission network at least part of which is external to a building, the network including input means for the input onto the network of a telecommunications signal having a carrier frequency greater than approximately 1 MHz and output means for removing said telecommunications signal from the network, said signal being transmissible along said external part of the network.

Contrary to the teachings of the prior art, use of a carrier frequency of this magnitude is not impractical due to attenuation effects. This is because, for at least higher frequencies, the cables of the power transmission and/or distribution network exhibit pseudo-coaxial characteristics and therefore attenuation is reduced.

In this way both speech and data signals can be transmitted at carrier frequencies of greater than approximately 1 MHz, allowing for a larger available spectrum and greater transmission capacity. The carrier frequency may in fact be less than 1 MHz i.e. 800 kHz or even as low as 600 kHz, but as it is reduced so is the bandwidth. A plurality of telecommunications signals may be provided, each having different carrier frequencies.

In a further aspect, the present invention provides a method of signal transmission including input of a telecommunications signal having a carrier frequency of greater than approximately 1 MHz onto at least one phase conductor of an electricity power distribution and/or transmission network, and subsequent reception of the signal from at least one other phase conductor of the network, said network having a number of phases, said number being chosen from the list 1,2,4,5,6,7,8,9, . . . n (where n is an integer greater than 9), but preferably having 1 or 2 phases.

Any or all of the above aspects may include features described elsewhere in this specification.

BRIEF DESCRIPTION OF THE DRAWINGS

Embodiments of the present invention will now be described with reference to the accompanying drawings in which:

FIG. 5A is a cross section through a typical three phase cable;

FIG. 5B is a section through a typical coaxial cable;

FIG. 6 is a first embodiment of a network conditioning unit for use with the present invention;

FIG. 19 is a graph of voltage versus frequency showing the use of CDMA transmission techniques according to an aspect of the present invention.

DETAILED DESCRIPTION OF THE PREFERRED EMBODIMENTS

Figure 1:
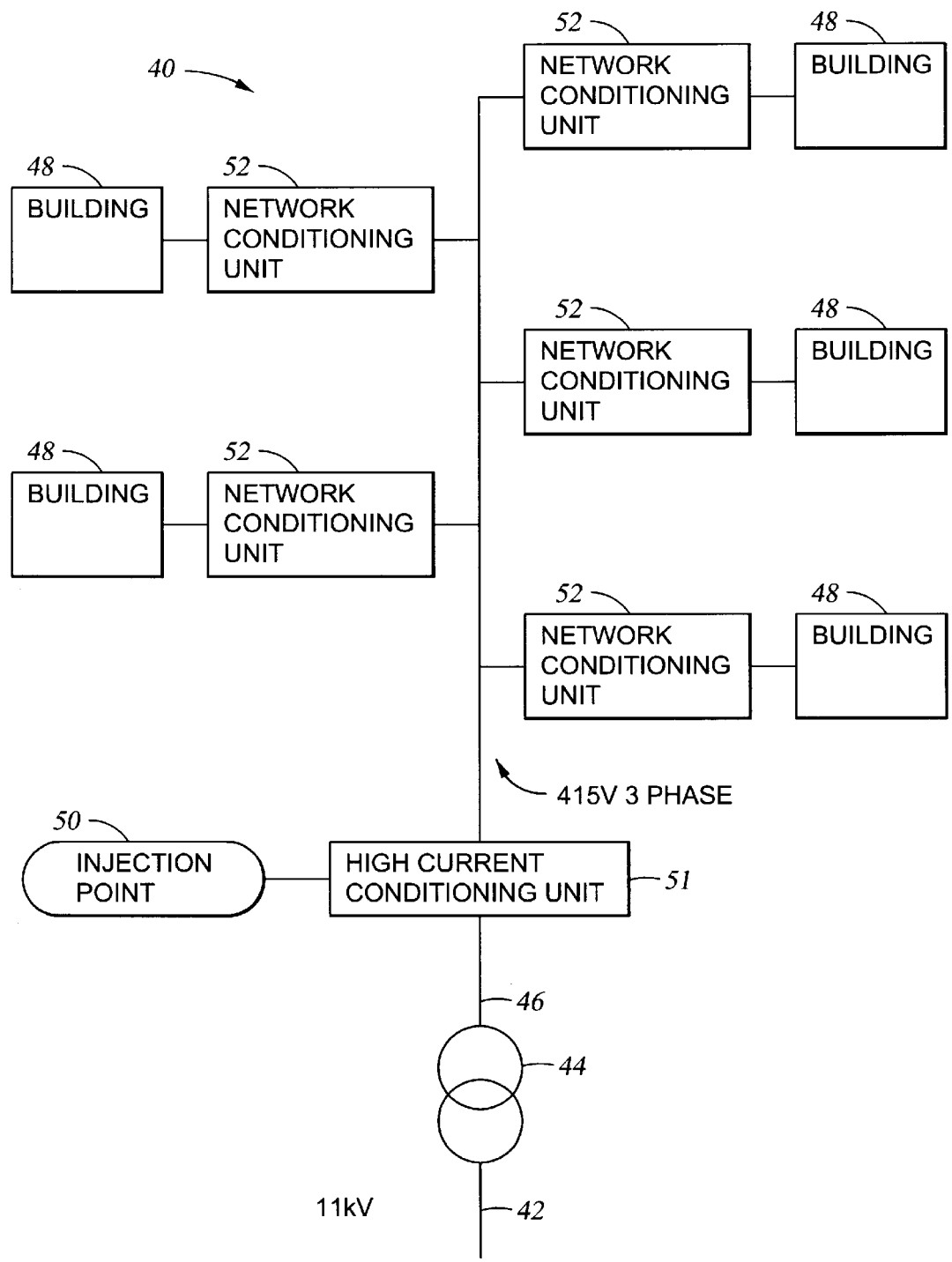
FIG. 1 is a schematic diagram of a part of a network in which aspects of the present invention may be used.

FIG. 1 shows generally a network 40. Mains electricity enters the network from an 11 kV transmission line 42, via a transformer 44 and onto a 415V three phase network 46. The 415V three phase network is supplied to a number of locations, such as buildings 48. Each of these buildings may receive only a single phase electricity supply or alternatively may receive a three phase power supply.

Voice and data signals may be injected into the network (or alternatively received from the network) at an injection point 50, to be received by users in the premises 48. In order to separate the voice and data communication signals from the low frequency high amplitude power signal each signal source and/or destination is provided with a network conditioning unit 52—shown in more detail in figure 11a. This network conditioning unit includes a low pass filter for separating out the two signals.

Figure 11A:
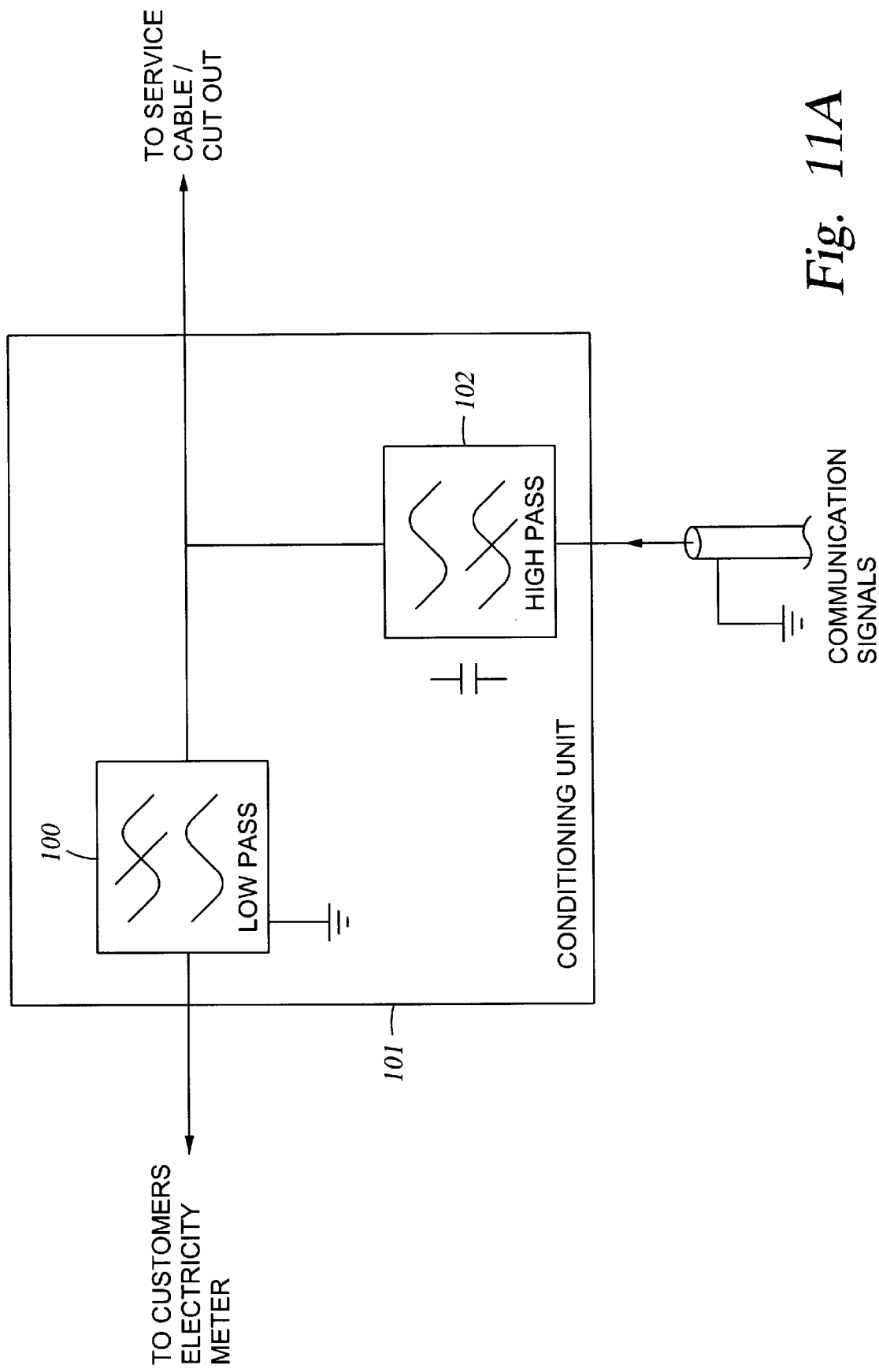
FIGS. 11a and 11b are schematic diagrams of network conditioning units as used with the present invention.
Figure 11B:
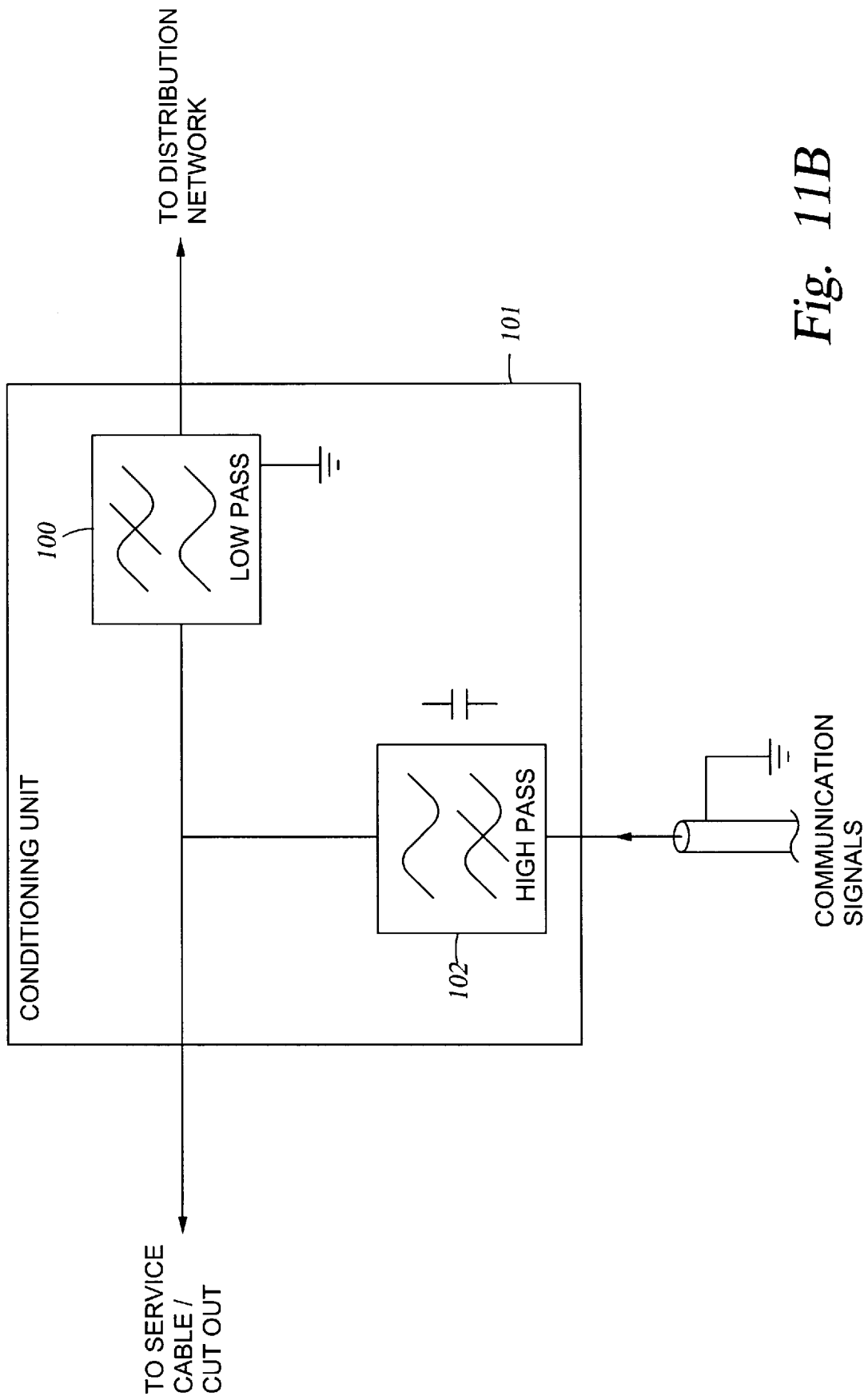

A further (high current) conditioning unit 51—shown also in figure 11b may be fitted between the electricity distribution transformer 44 and the injection point 50 in order to further remove transformer noise from the conditioned network 40. The unit 51 is fitted with a high current inductor.

Figure 2:
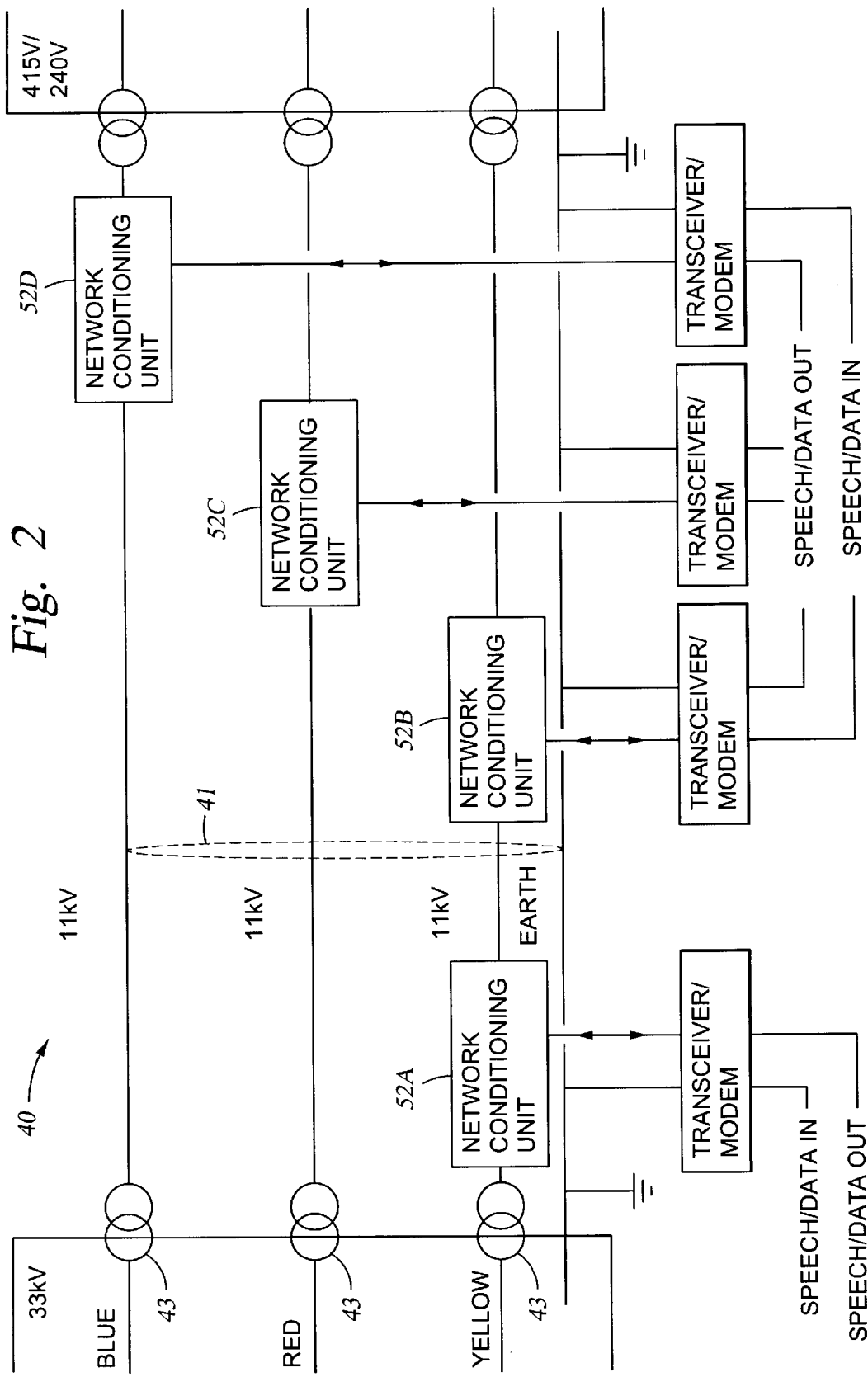
FIG. 2 is a schematic diagram of a first transmission system for a network according to FIG. 1.

FIG. 2 shows a portion of a three phase network 40 into which and from which data signals may be transmitted and received using the network conditioning units 52. The cable of the network 40 is clad i.e. is surrounded by a sheath 41 e.g. along all or substantially all of its length. As an example, data signals could be transmitted onto the yellow phase of the network by network conditioning unit 52A i.e., the signal is applied between the yellow phase and earth as shown. The transmitted data may then be received by any or all of conditioning units 52B, 52C and 52D which are connected to the yellow, red and blue phases respectively. In other words transmitted data may be picked up on any phase of the cable, including the phases onto which the signals were not injected by the transmitting unit. This is due to the mutual capacitance between the phase conductors producing an effectively pseudo-coaxial nature of the three phase cable. As can be seen, data can be transmitted and received by each unit.

Each phase of the network 40 is shown to include a transformer 43. Typically this is effected by a single three phase transformer for all three phases, and not by three separate single phase transformers—although the latter may be possible.

Figure 3:
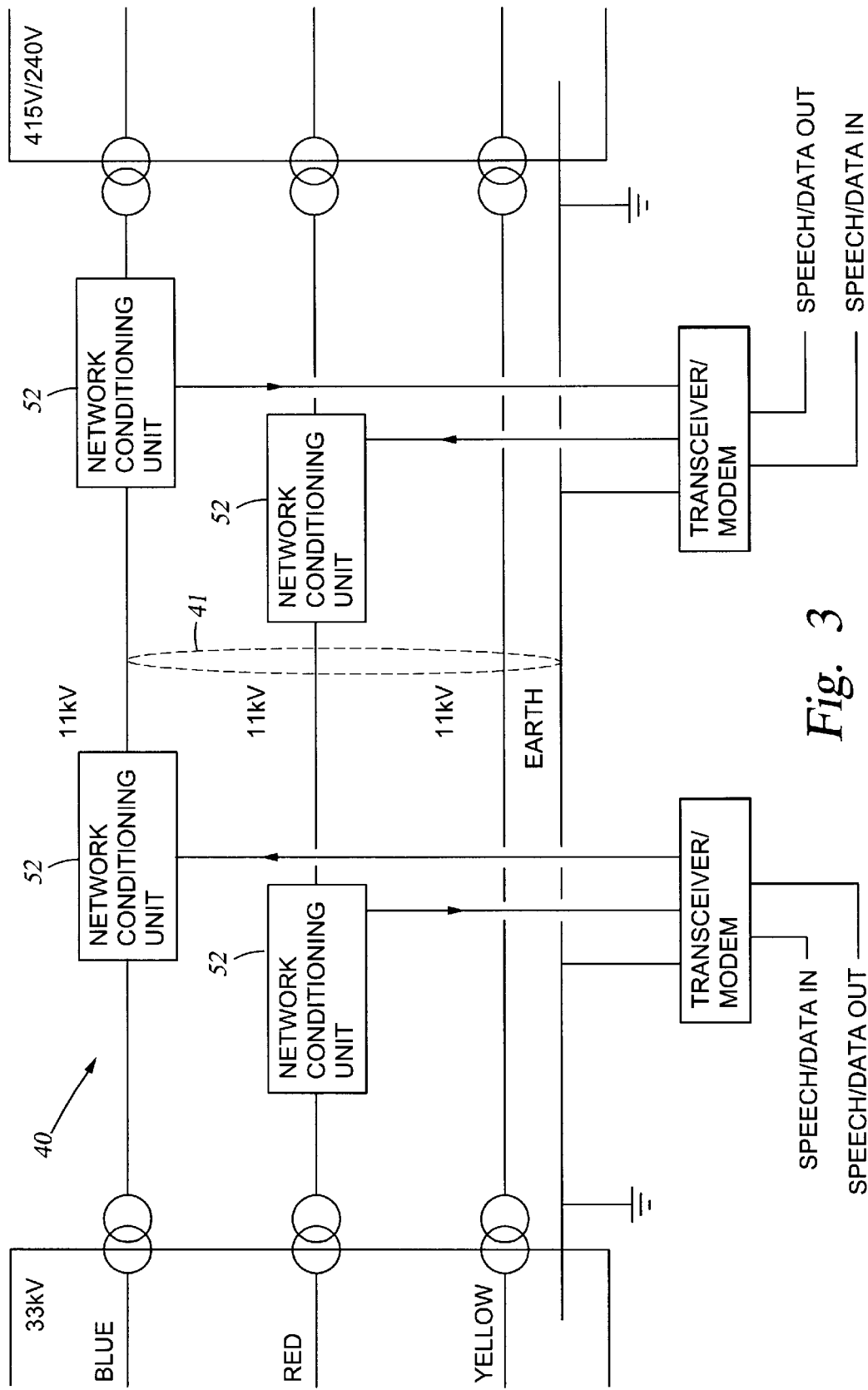
FIG. 3 is a schematic diagram of a second transmission system for a network according to FIG. 1.

FIG. 3 shows a portion of a three phase network 40 into which and from which data signals may be transmitted and received using four network conditioning units 52. As shown, the data signals are transmitted across two phases of the three phase network—in this case the red and blue phases.

If one or more phases are not in use (e.g. the yellow phase in FIG. 3), the non-used phases(s) may be terminated to provide an appropriate impedance. This may be done using an "L" circuit i.e. a series inductor with a shunter capacitor on the transformer side. This provides an optimum impedance and ensures that an RF signal which is coupled between e.g. the red and yellow phases, is not shunted down by a low impedance transformer connection. This is particularly useful if there is insufficient inductive reactance at e.g. the yellow phase transformer connection point.

Figure 4:
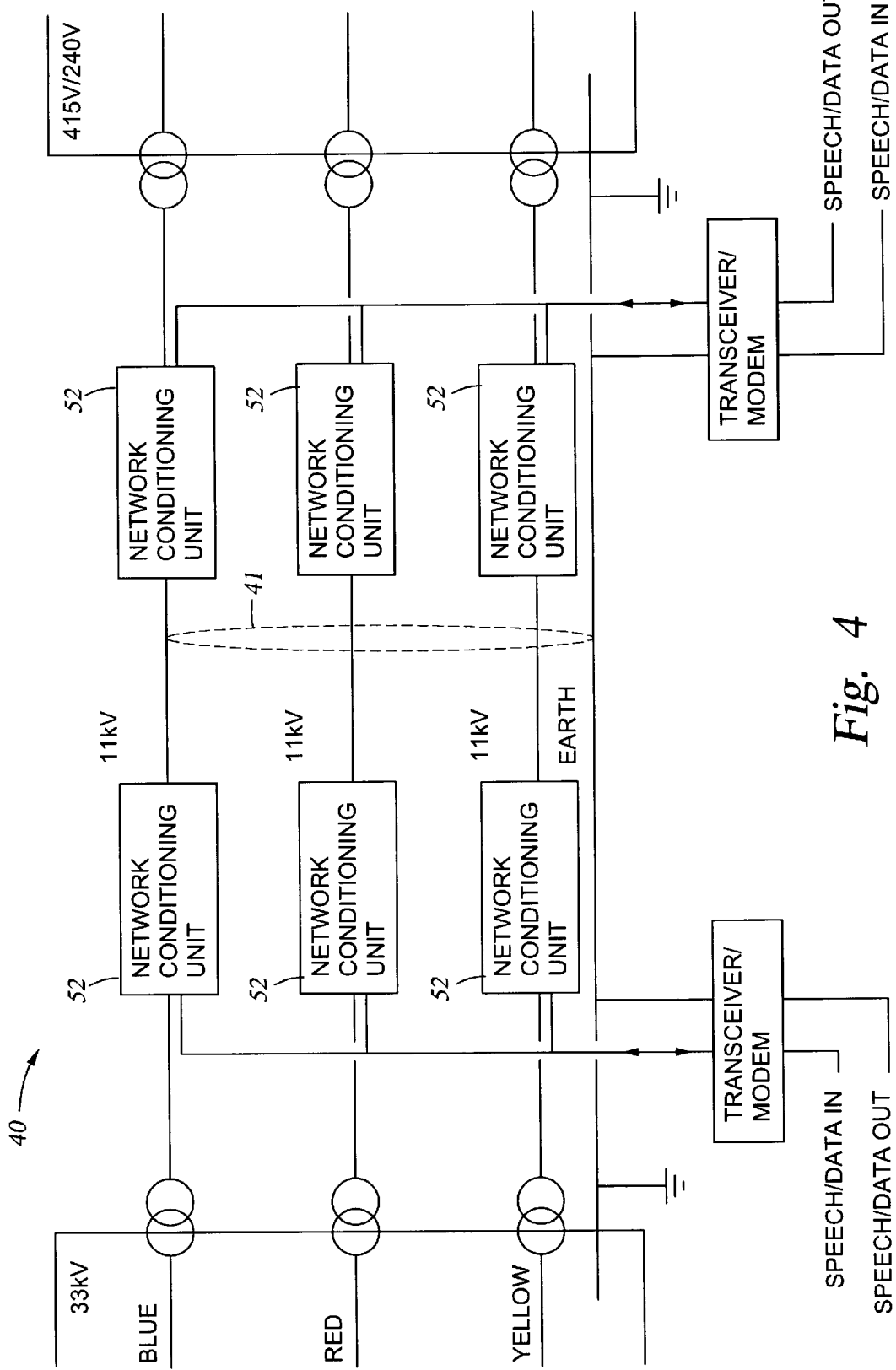
FIG. 4 is a schematic diagram of a third transmission system for a network according to FIG. 1.

In FIG. 4 an alternative transmission system to FIG. 2 is shown, in which the data signals are transmitted across all three phases, i.e. blue, red and yellow, of the three phase network 40.

Figure 13:
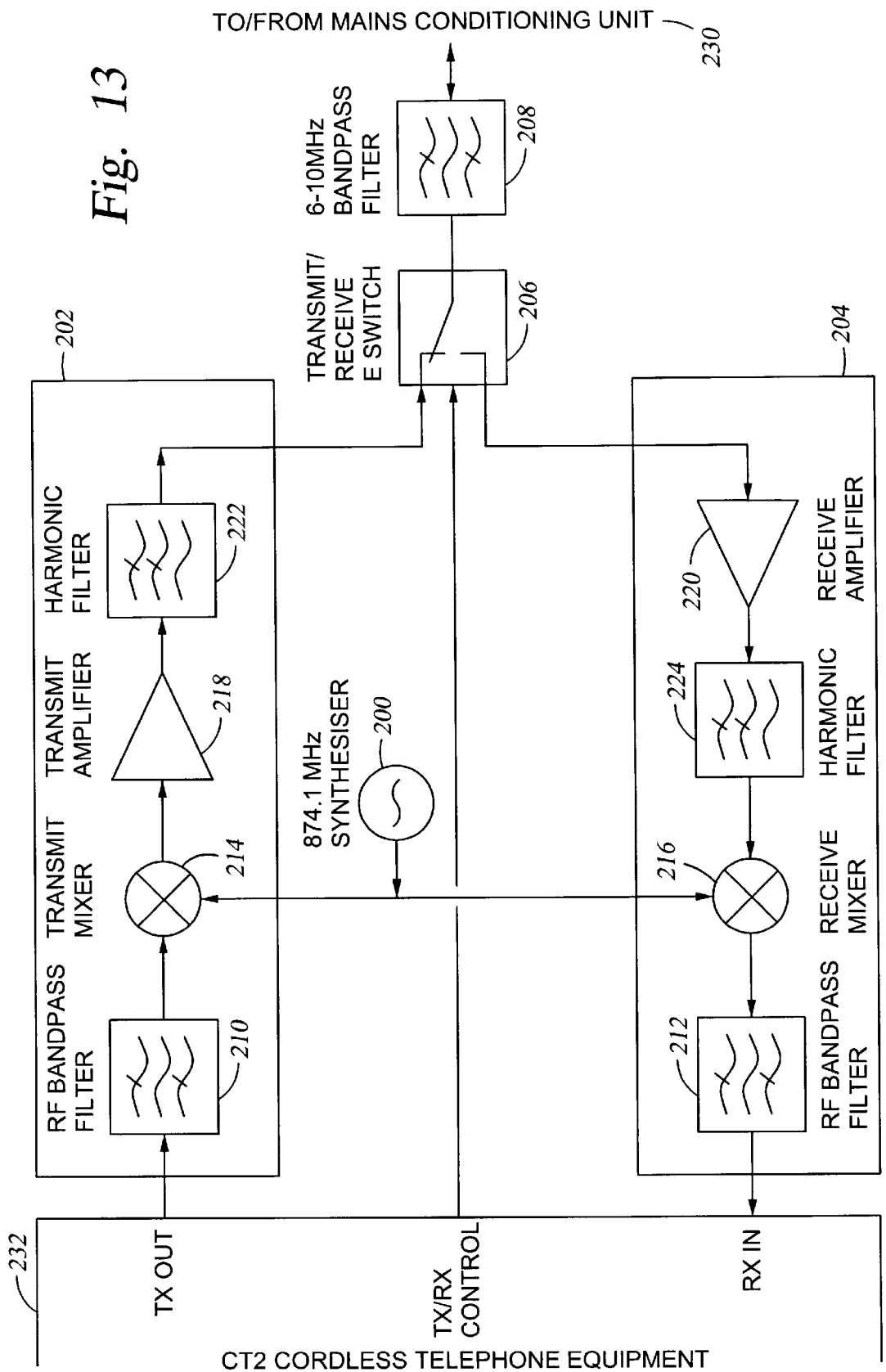
FIG. 13 is a block diagram for a frequency converter according to an aspect of the present invention.

FIG. 13 is a schematic diagram showing an example of using one particular telephonic protocol (CT2) with a network according to the present invention. In normal use, CT2 equipment transmits and receives at a radio frequency of 866±2 MHz. The network is not generally suited for the transmission of signals at this frequency, and so the system therefore incorporates frequency translation equipment to convert the CT2 signal to a frequency range of 8±2 MHz, in this example.

The equipment of FIG. 13 is based around a standard single line CT2 handset and base station pair. In order to allow the handset to provide the functions of a conventional wired telephone line at the subscriber's premises, baseband interface circuitry (see FIGS. 16 and 17) is used in addition to the frequency conversion system.

The subscriber and substation equipment normally each contain the CT2 equipment plus three additional boards. These consist of the frequency converters and ready-built power supply (PSU) modules, which are identical in both equipments, and the baseband interface boards which are different for each unit.

The frequency converter consists of five main parts: the synthesiser 200, down converter 202, up converter 204, transmit/receive switch 206 and a band pass filter 208. Each of the up and down converter stages includes a RF band pass filter 210, 212 respectively, a mixer 214, 216 respectively, an amplifier 218, 220 respectively and a harmonic filter 222, 224 respectively.

In use, signals being transmitted from the conditioning unit 230 to the CT2 telephone equipment 232 will have their carrier frequency "up converted" by the up converter 204. Similarly, signals being transmitted from the CT2 equipment 232 to the conditioning unit (and then on to the network) will be "down converted" using down converter 202. The transmit/receive switch 206 operates to ensure that the appropriate frequency conversion occurs.

Figure 14A:
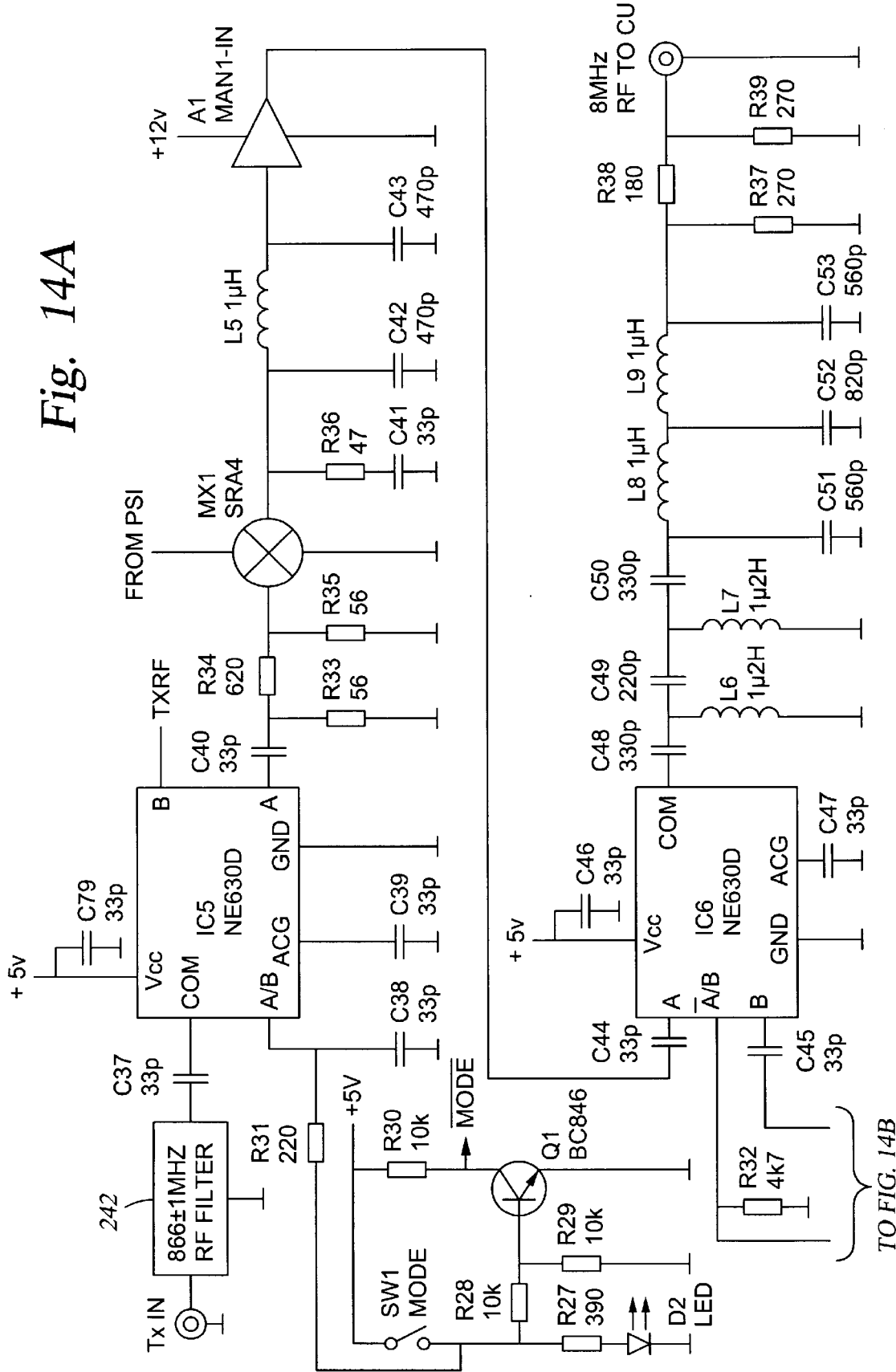
FIG. 14A and 14B together comprise a circuit diagram for the frequency converter of FIG. 13.
Figure 14B:
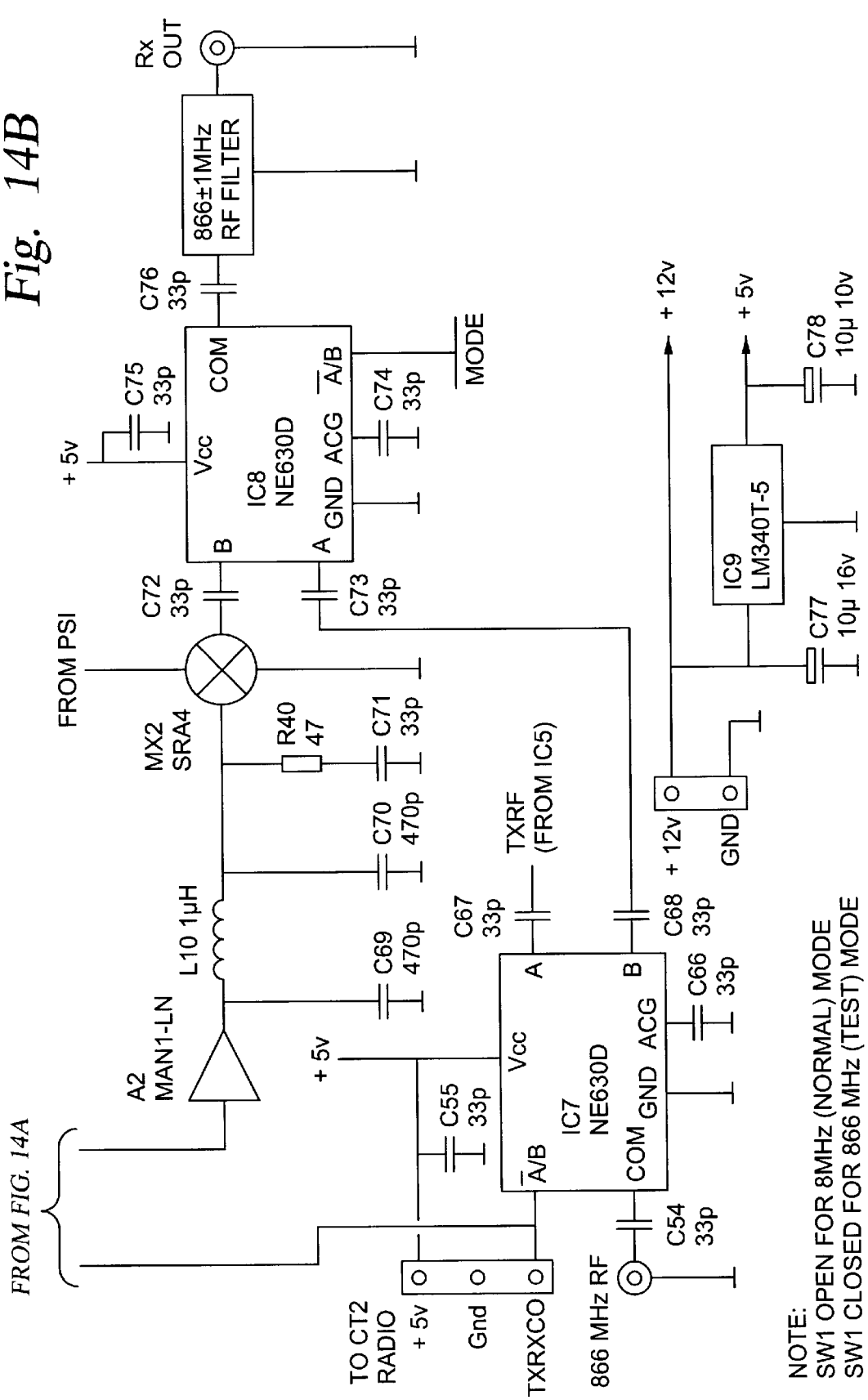

FIGS. 14A and 14B together show in more detail a circuit diagram of a suitable frequency converter.

With reference to FIG. 14A, transmitted signals from the CT2 equipment are applied to the "TX IN" port, passed through a ceramic filter 24L to eliminate spurious products, and reach the down-converter mixer via an attenuator and the mode switch IC5. The difference signal from the mixer is amplified by A1 and passes to the transmit—receive switch IC6, which is controlled by the TXRXCO signal from the CT2 radio unit. From this switch the signal passes through the band filter, which consists of cascaded fifth-order Butterworth high-pass and low-pass sections (L6–9, C48–53). These have cutoff frequencies of 6 MHz and 10 MHz respectively.

The filter output is passed through a 3 dB attenuator, which serves to provide a reasonable match for the filter even when the impedance match of the output load is poor, and emerges at the "8 MHz RF to CU" port. This port is connected to the mains conditioning unit (CU) which couples the RF signal into the network.

Incoming signals from the conditioning unit pass back through the 6–10 MHz band-pass filter and TX/RX switch IC6, emerge from port 'B' and are amplified by A2 in FIG. 14B. The output of this amplifier is harmonic filtered and applied to the up-conversion mixer MX2. The output of this mixer is fed to the input of the CT2 receiver via mode switch IC8 and a second 866 MHz ceramic band-pass filter.

The purpose of the mode switches is to allow access to the 866 MHz transmit and receive paths of the CT2 radio. This enables a link to be set up at 866 MHz (either by cable or through antennas) for test purposes.

The 866 MHz signal paths are diverted away from the frequency converter proper by IC5 (FIG. 14A) and IC8 (FIG. 14B), and are recombined by IC7 (FIG. 14B) which acts as a transmit/receive switch controlled by the TXRXCO signal from the CT2 radio. In this manner the "866 MHz RF" port (which is brought out to an internal test socket) effectively replaces the original antenna port of the radio, and can be used in the same manner. The mode switches are controlled by logic signals from the on-board switch SW1, both true and complementary signals being generated in order to simplify the routing of the RF tracks around the switch ICs. It should be noted that the mode control and 866 MHz RF port are located internally to the equipment and do not play a part in its normal operation.

Figure 15A:
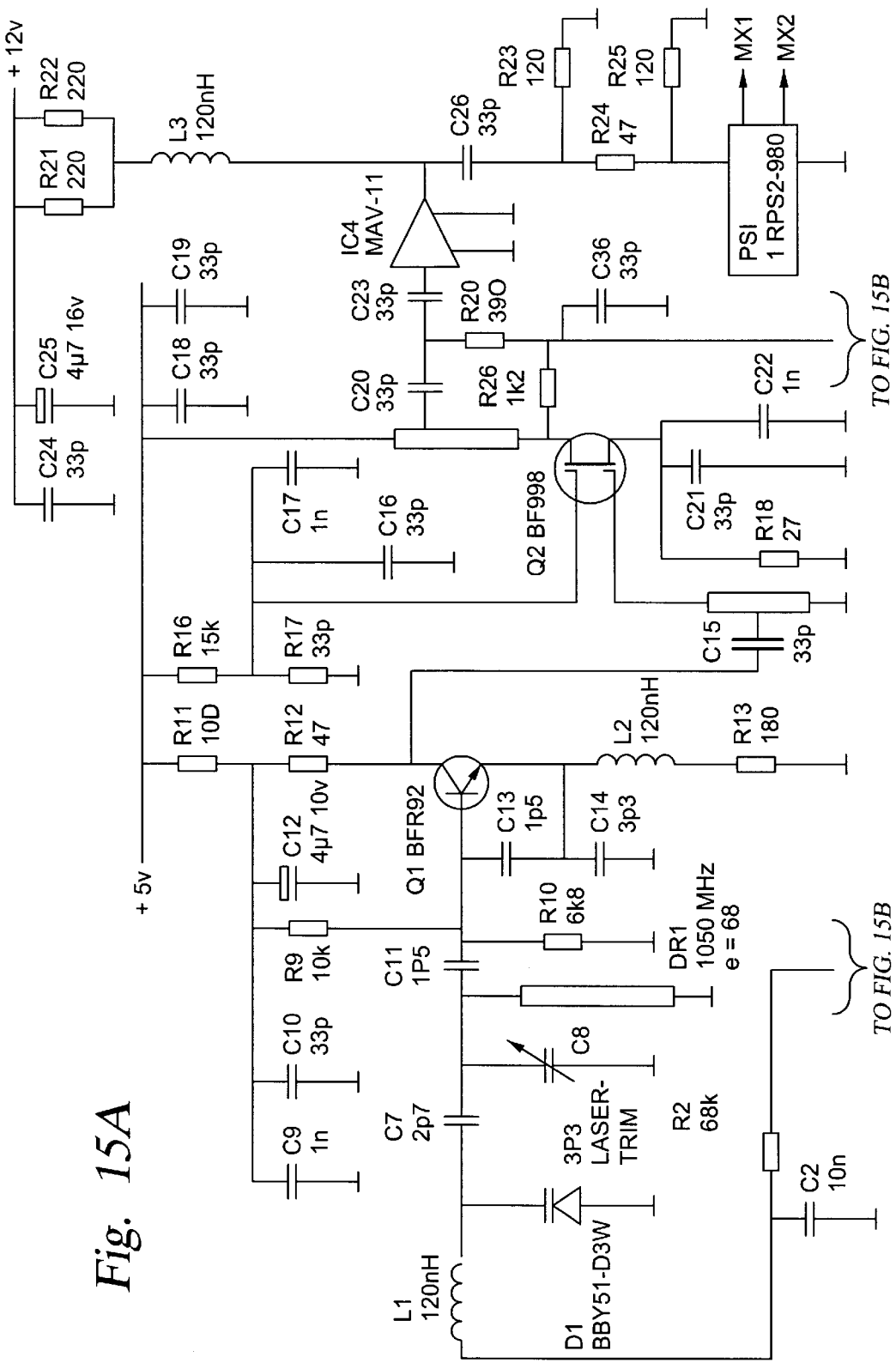
FIG. 15A and 15B together comprise a circuit diagram of a synthesiser circuit for the frequency converter of FIG. 14.
Figure 15B:
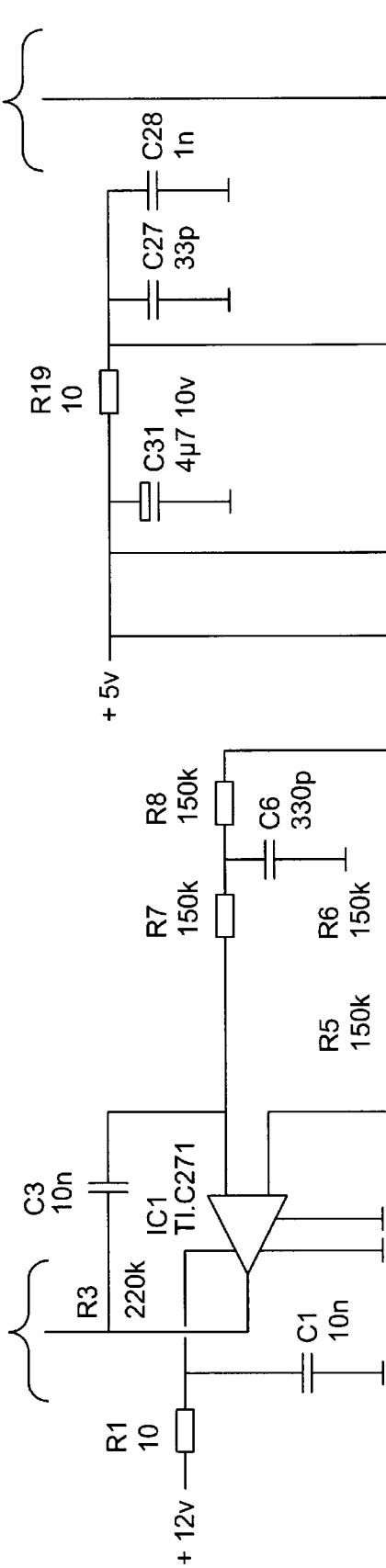

The 874.1 MHz local oscillator is generated by the synthesiser circuit shown in FIGS. 15A and 15B. As shown on FIG. 15A, the VCO, which operates on the output frequency, is a Colpitts oscillator based around Q1. The frequency is determined by the components around coaxial dielectric resonator DR1 and varactor diode D1. The output of the VCO is amplified and buffered by dual-gate MOSFET Q2, after which a signal is taken off to drive the prescaler IC3. The oscillator signal is then further amplified by IC2 and split two ways by power divider PS1 to drive the up- and down-conversion mixers.

As shown in FIG. 15B, the control loop is formed by the synthesiser IC2, dual-modules prescaler IC3, and the loop filter based around IC1 and associated components. The loop is of conventional Type II design, with a narrow bandwidth of about 150 Hz. The frequency reference is provided by a 12.8 MHz TCXO module driving the reference input of IC2.

Figure 16:
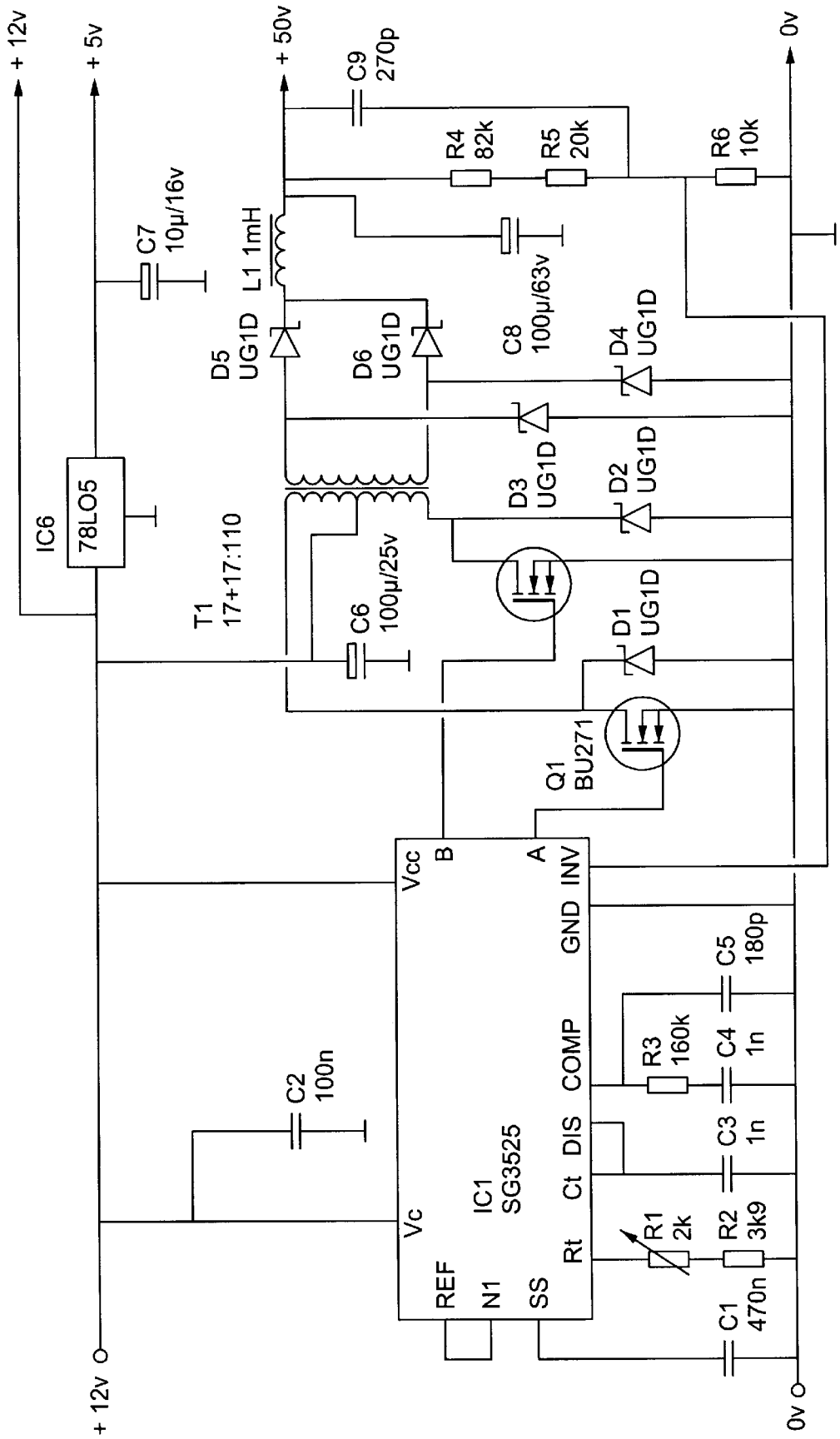
FIG. 16 is a circuit diagram for a power supply for a CT2 handset interface according to an aspect of the present invention.

FIG. 16 is a circuit diagram of a power supply for the interface board to interface between the CT2 handset and a basic telephony service.

The power supply provides three voltage rails:

+12v—for audio circuitry (as supplied from PSU board)
+5v—for control logic
+50v—for line interface The incoming supply is +12v. This is regulated down to +5v by linear regulator IC6. The +50v supply is derived from the +12v rail by a push-pull forward converter based around IC1. Q1–2, D1–6,T1 and L1. The design is conventional, but an adjustment is provided for the oscillator frequency. This allows the frequency to be set so that its harmonics do not fall within the bandwidth of the CT2 second IF at 500 kHz. This is achieved by using a frequency of 110 kHz for the power converter, placing the 4th and 5th harmonics at 40 kHz and 550 kHz respectively.

Figure 17A:
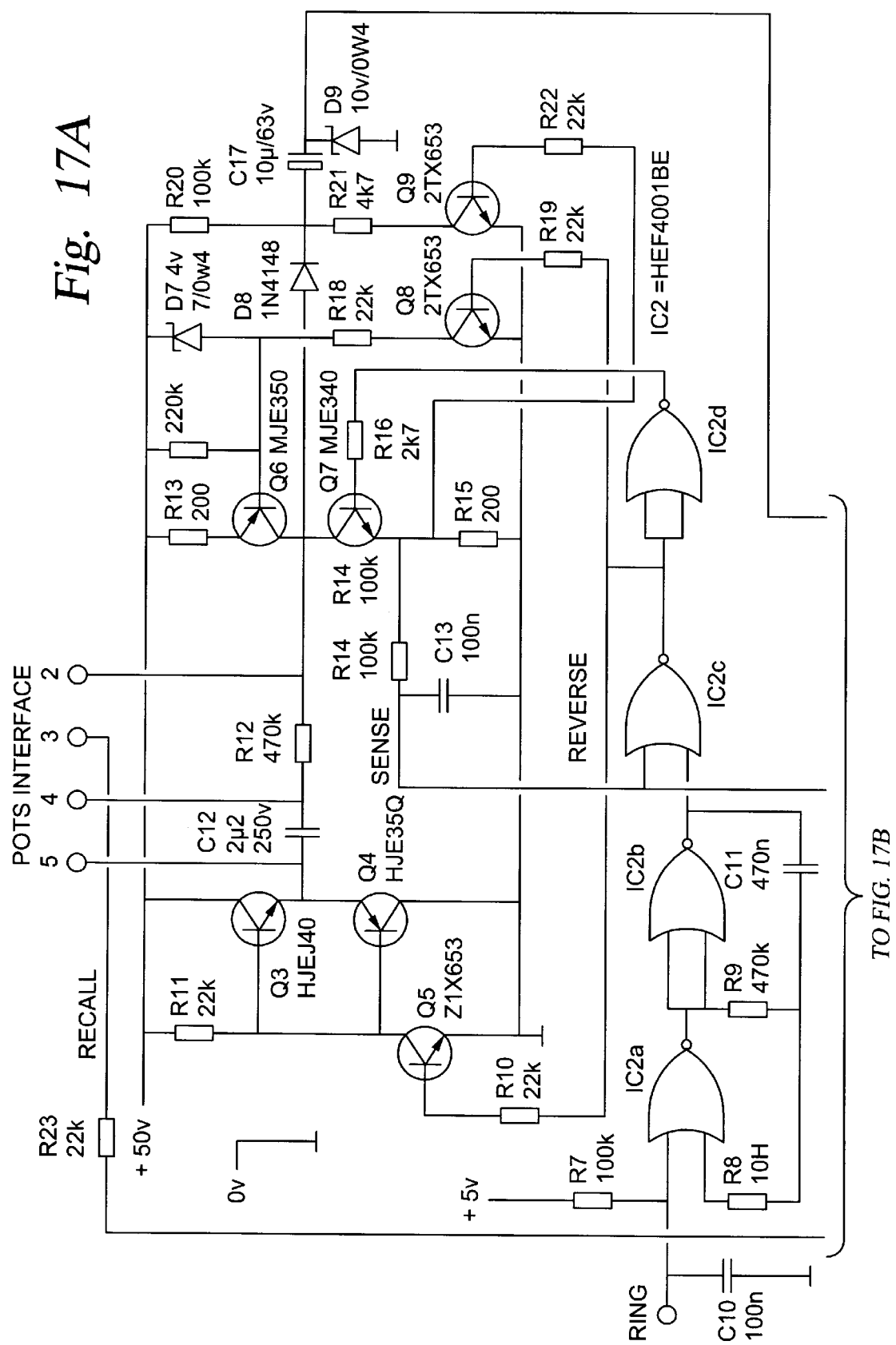
FIG. 17A and 17B together comprise a circuit diagram of a CT2 handset interface for use with the power supply of FIG. 16.
Figure 17B:
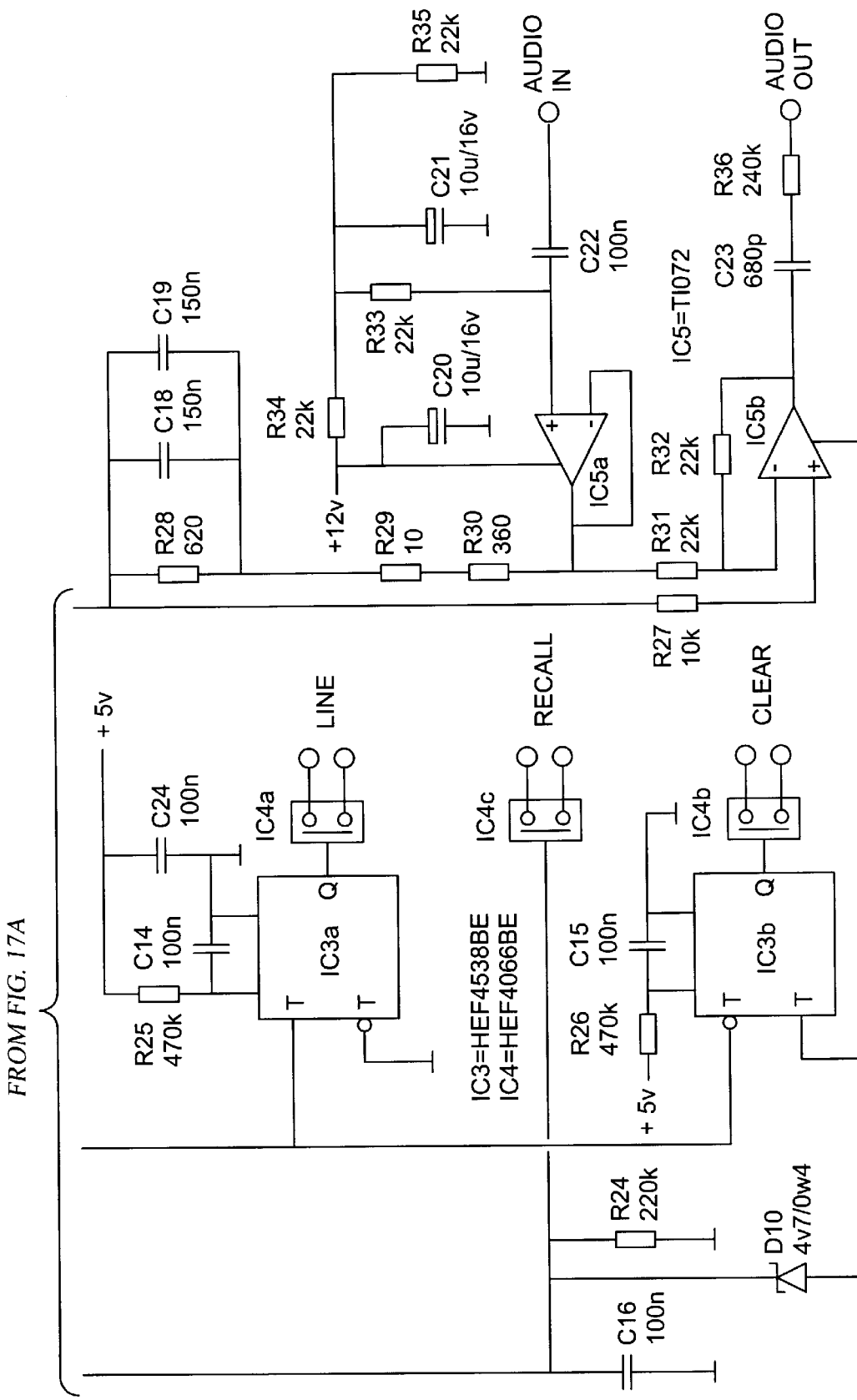

FIGS. 17A and 17B together comprise a circuit diagram of an interface for the CT2 handset, including the line interface, audio interface and control logic.

The line interface in FIG. 17A is based around Q3–9, IC2 and their associated components, and handles both incoming and outgoing calls.

For outgoing calls, under quiescent conditions, REVERSE is low. When the subscriber's terminal goes off-hook, line current flows from the +50v supply via Q3, the subscriber's terminal and the constant-current sink formed by Q7 (whose base is held at +5v) and R15. A voltage is thereby developed across R15, and this performs three functions. Firstly, the rising edge of this signal triggers IC3a in FIG. 17B, which enables IC4a for about 50 ms. IC4a simulates operation of the CT2 handset's "Line" key and thus causes the CT2 system to initiate an outgoing call. Secondly, it pulls one input of IC2c high, which forces REVERSE to stay low. Thirdly, it switches on Q9. This pulls the junction of R20 and R21 down to a low level, forward-biassing D8 and thus connecting C17 and the rest of the audio circuitry (based around ICS) to the line.

When the subscriber's terminal goes back on-hook, line current ceases to flow and the voltage across R15 drops. The falling edge of this signal triggers IC3b and IC4b, which together simulate operation of the CT2 handset's "Clear" key. This causes the CT2 system to clear down.

On receipt of an incoming call, the CT2 handset activates an internal open-drain buffer (which would normally drive the ringing transducer) which is connected to the RING line and thereby discharges C10. This enables a 25 Hz oscillator formed by IC2a,b and associated components.

Provided that the subscriber's terminal is on-hook, the output from this oscillator is gated to REVERSE. During the time that REVERSE is high, Q3 and Q7 are switched off, whilst Q4 and Q6 are enabled, reversing the polarity of the voltage applied to the line. In this manner the line is driven with a 25 Hz square wave of 100Vpk-pk. Whilst this is lower than the ringing voltage supplied by a normal public exchange line, it is nevertheless sufficient to cause the subscriber's terminal to register an incoming call. The ringing current is not sufficient to develop a voltage across R15 which will operate IC2c or Q9. In fact the reason why Q9 and D8 are fitted is to ensure that this is so. If these components were not present then ringing current would flow in C17, which would not only heavily load the 50V supply, but would also trigger the "off-hook" detection circuitry (IC2c, IC3) and thus cause malfunction of the system.

In order to simplify the system, no facility is provided for decoding the dialled digits from the subscriber's terminal. It is therefore impossible to operate the present system in loop-disconnect mode. DTMF tones generated by the subscriber's terminal will be passed transparently through the audio channel once the line is established.

Recall is achieved by IC4c and associated components. Since both wires of the line will normally have close to +50v on them, the 'earth recall' facility on the subscriber's equipment will pull the recall line, and thus the control input of IC4c, up to a high level (rather than pulling the line voltage down to earth as would happen on a public exchange). IC4c is connected across the 'recall' key of the CT2 handset. It should be pointed out that the "earth" wire (actually the RECALL line) is at a more negative voltage than the A and B wires of the line, rather than more positive as is normal practice on public exchange lines.

The hybrid is formed by IC5 and associated components, and is coupled to the line via C17. Output from the CT2 handset is applied to the non-inverting input of IC5a, which is configured as a unity-gain buffer. The output of IC5a drives the line via the balancing impedance Zb, which is formed by C18, C19 and R28–30.

IC5b acts as a conventional differential amplifier. If the impedance presented by the line is the same as Zb, then any signals arising from the output of IC5a appear purely in common mode at the inputs of IC5b and thus do not appear at the output of the latter. Incoming signals from the line, however, are applied only to the non-inverting input of IC5b and are passed on with a gain of +2. The output from IC5b forms the input signal for the CT2 handset.

Figure 18:
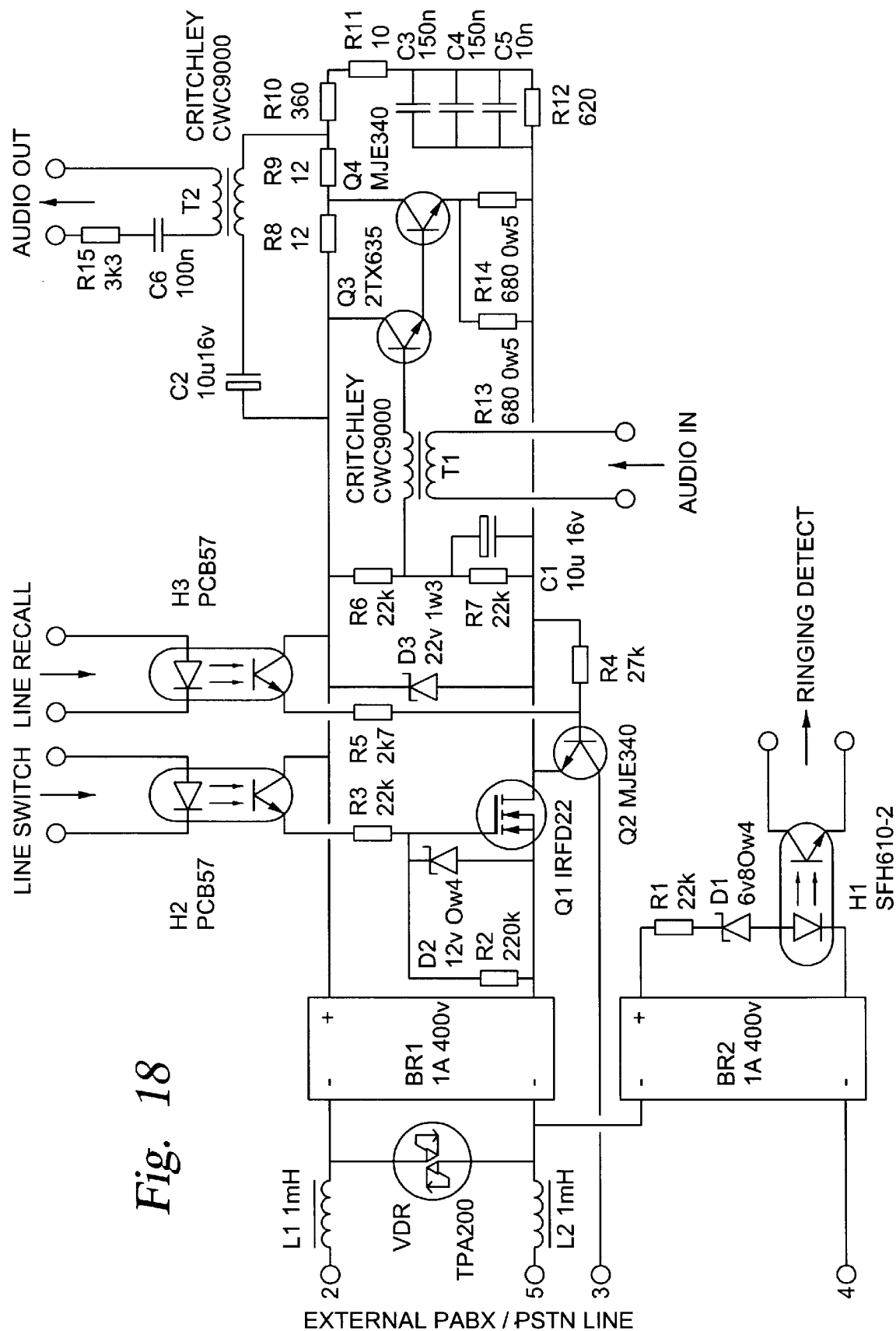
FIG. 18 is a circuit diagram of a base station line isolator circuit for use with the present invention.

FIG. 18 is a circuit diagram of an isolation interface for use between a base station and sub-station equipment. It is necessary to isolate the base station from the PSTN line to allow connection to mains earth as the line interface is not isolated from the RF part in the original design. This is accomplished by means of a small add-on board which takes over the hybrid and line switching functions.

The circuit diagram of this board is shown in FIG. 6. After passing through protection network L1-L2-VDR (transferred from original GPT base station) the line current is rectified by BR1 to make the circuit independent of line polarity. Q1 provides the line switching function and is driven from the base station's control logic via IL2 and R2, R3 and D2. The earth recall facility is provided by Q2 and associated components, driven via IL3. Conveniently, these functions are both controlled using opto-isolators in the original circuit, although these were used for level-shifting rather than isolation. It should be noted that the output transistors of IL2 and IL3 have to be capable of withstanding the peak ringing voltage in the 'off' state, so high voltage types are specified here.

Ringing current is rectified by BR2 and drives IL1 via R1 and D1—the latter being present to prevent high level audio signals from getting through to IL1.

As there is no facility for loop-disconnect dialling in this system, no masking circuitry is needed either for the audio path or the ringing detector. This would otherwise be required to prevent the loop-disconnect pulses from operating the ringing detector or overloading the audio channel.

The remaining circuitry provides the audio path. Signals to be transmitted are applied to Darlington Q3–Q4 via isolating transformer T1 and associated bias components. This pair of transistors in conjunction with R13 and R14 form a constant-current source which is modulated by the outgoing audio signal. The resulting signal splits via R8 and R9 between the line and the balance impedance formed by C3–5 and R10–12. If the line impedance is equal to the balance impedance, the signal voltages across R8 and R9 are equal and opposite and no signal appears across T2. This arrangement thereby provides sidetone cancellation. Incoming signals from the line however, do develop a signal in T2 which is output to the CT2 base station.

Another particularly suitable communication protocol for use with the present invention is CDMA, and FIG. 19 is a graph of voltage against frequency for an exemplary CDMA signal according to the present invention. Line 400 designates the basic CDMA signal which is a relatively broadband low power signal. However, according to one aspect of the present invention, additional signals can also be transmitted at the same time. Examples of such additional signals are designated 402, 404 and 406, and it will be seen from FIG. 19 that such additional signals are relatively narrow band signals.

The narrow band signals will interfere with the CDMA signal in the regions covered by those narrow band signals, but the data included in the CDMA signal may still be recoverable from the other parts of the frequency spectrum of the CDMA signal. Thus additional data signals (402, 404 and 406) can be included along side the basic CDMA signal 400.

FIG. 5A shows a simplified cross section of a three phase power cable 54, including red phase 56, yellow phase 58, and blue phase 60. Data signals are transmitted between blue phase 60 and earth 62, and are injected into the network via network conditioning unit 52. At high frequencies, the mutual capacitance between the phases effectively produces a short circuit. Therefore, such a transmission system gives a pseudo-coaxial characteristic, roughly equivalent to the coaxial cable shown in FIG. 5B. The mutual capacitance between any two of the phases in the three phase cable is shown schematically as 64 in FIG. 5A—similar mutual capacitance exists between other parts of phases.

The basic elements of a network conditioning unit 101 according to one aspect of the present invention are illustrated in FIGS. 11a and 11b. FIG. 11a shows conditioning units as designated 52 and 51 in FIG. 1 respectively. The conditioning unit can be considered to be equivalent to a low pass filter 100 and a coupling capacitor element 102 (which can be considered to be a high pass filter element).

The low pass filter element 100 allows mains power to be supplied from the distribution network to a consumer whilst preventing high frequency communication signals from entering the consumers premises. A coupling capacitor, or high pass filter element, 102 is provided to couple the high frequency communication signals onto the distribution network whilst preventing the mains power from entering the communications apparatus.

The conditioning unit components may be fitted into e.g an electricity meter case located in a consumer's premises, or possibly may be set into a compartment at the rear of such a meter. Alternatively the necessary components may be located in e.g. a customer's high rupturing capacity (HRC) fuse or cut-out unit.

Referring to FIG. 6, an embodiment of a conditioning unit (essentially a filter) according to an aspect of the invention is indicated generally by the reference numeral and is connected between a mains electricity input 12 and a mains electricity output 14. A signal input/output line 16 is also connected into the filter. The mains power line is a standard 50 Hz mains electricity power supply providing a domestic electricity power source of 240v at a maximum current of 100 amps for normal usage.

The filter 10 is assembled into a metal box which prevents radiation of the communication signals to externally located appliances and which provides a connection 18 to earth for the signal input/output line 16. The filter 10 includes a first or main inductor 20 formed e.g. of 16 mm$^2$ wire wound on a 10 mm diameter, 200 mm long ferrite rod with 30 turns of wire therearound. This provides an inductance of approximately 50 $\mu$H. This may be a minimum for the signal characteristics utilised. The use of better materials or a plurality of series inductors would increase the inductance of the inductor up to, for example, approximately 200 $\mu$H.

Each end of the main inductor 20 is provided with a connection to the signal input/output line 16. A first connection 22 between the mains electricity input 12 and signal input/output line 16 comprises a first or coupling capacitor 24 having a capacitance of between 0.01 and 0.50 $\mu$F, and preferably around 0.1 $\mu$F. This coupling capacitor 24 is connected to a first fuse 26 which is arranged to blow in the event of failure or a fault developing in capacitor 24.

A second connection 28 includes a second capacitor 30 having a capacitance of between 0.001 and 0.50 $\mu$F, preferably around 0.1 $\mu$F. This capacitor provides further attenuation of the communication signals by shorting to the earth or ground 18. A second fuse 32 is provided to blow if a fault develops in the second capacitor 30, thereby preventing further unit damage.

The signal input/output line 16 is connected to a second inductor 34 having an inductance of approximately 250 $\mu$H minimum. This inductor is provided as a damage limiter in the event of failure of the coupling capacitor 24. In the event of such failure this inductor provides a path to the ground 18 for the 50 Hz mains electricity power frequency, thereby blowing fuse 26. The inductor has no effect on the communication frequency signals present on the signal input/output line 16.

Figure 7:
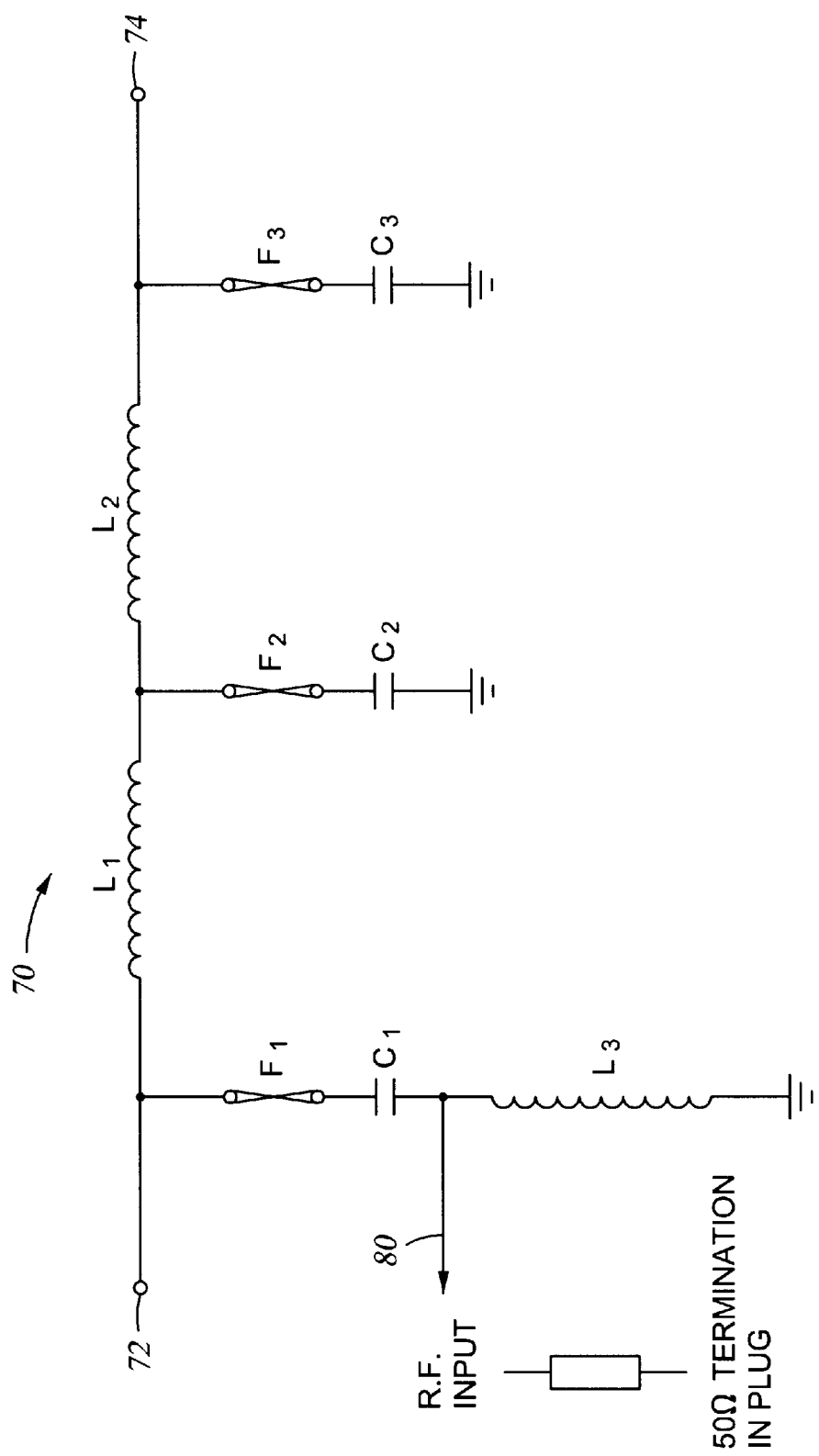
FIG. 7 is a second embodiment of a network conditioning unit for use with the present invention.

FIG. 7 shows a second embodiment of a filter according to an aspect of the present invention. The filter 70 includes a pair of inductors L1, L2 arranged in series between a mains electricity input 72 and a mains electricity output 74. A preferred value for L1 and L2 is approximately 16 $\mu$H. Connected between the RF input line 80 and the mains input 72 is a first fuse F1 and capacitor C1, and connected between the RF input 80 and ground is a third inductor L3, which acts as an RF choke and has a typical value of 250 $\mu$H.

Connected in a similar fashion between the connection point of L1 and L2 and ground is a second fuse F2 and second capacitor C2. Connected between the mains electricity output 74 and ground is a third fuse F3 and third capacitor C3. A typical value for the capacitors is around 0.1 $\mu$F and for the fuses approximately 5 amps HRC (high rupturing capacity).

The values given for these components are exemplary only, and different preferred values will be appropriate for other design frequencies.

Figure 8:
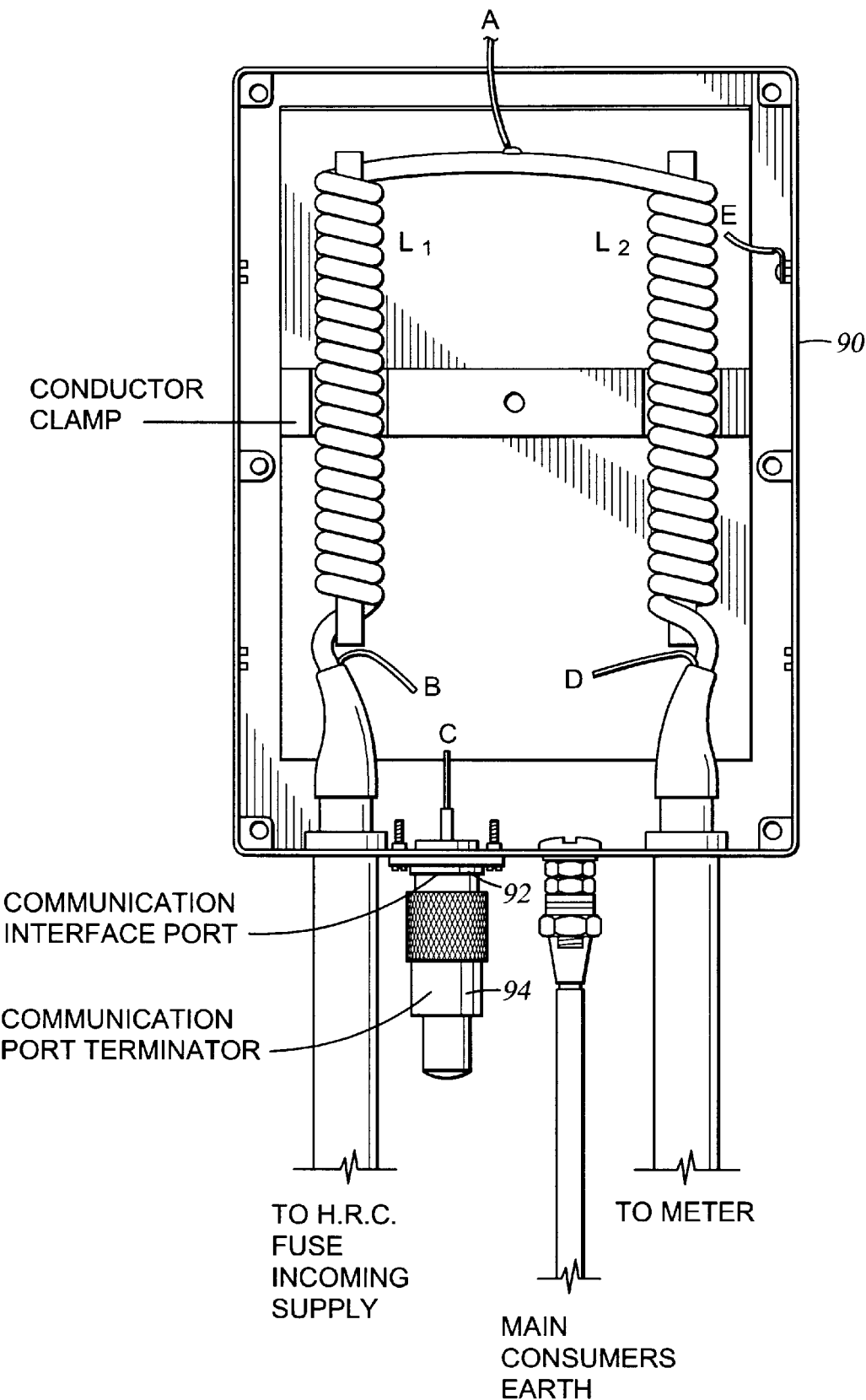
FIG. 8 is a plan view of a network conditioning unit according to FIG. 6.

Turning to FIG. 8 a typical housing arrangement for a network conditioning unit according to an embodiment of the present invention is shown. The main inductors L1 and L2 are housed within a shielding box 90. Various connections are shown, including a communication interface port 92 to which a user's communication equipment would normally be connected. However, as shown in FIG. 8, this port may be terminated in an impedance matching port terminator 94.

Figure 9:
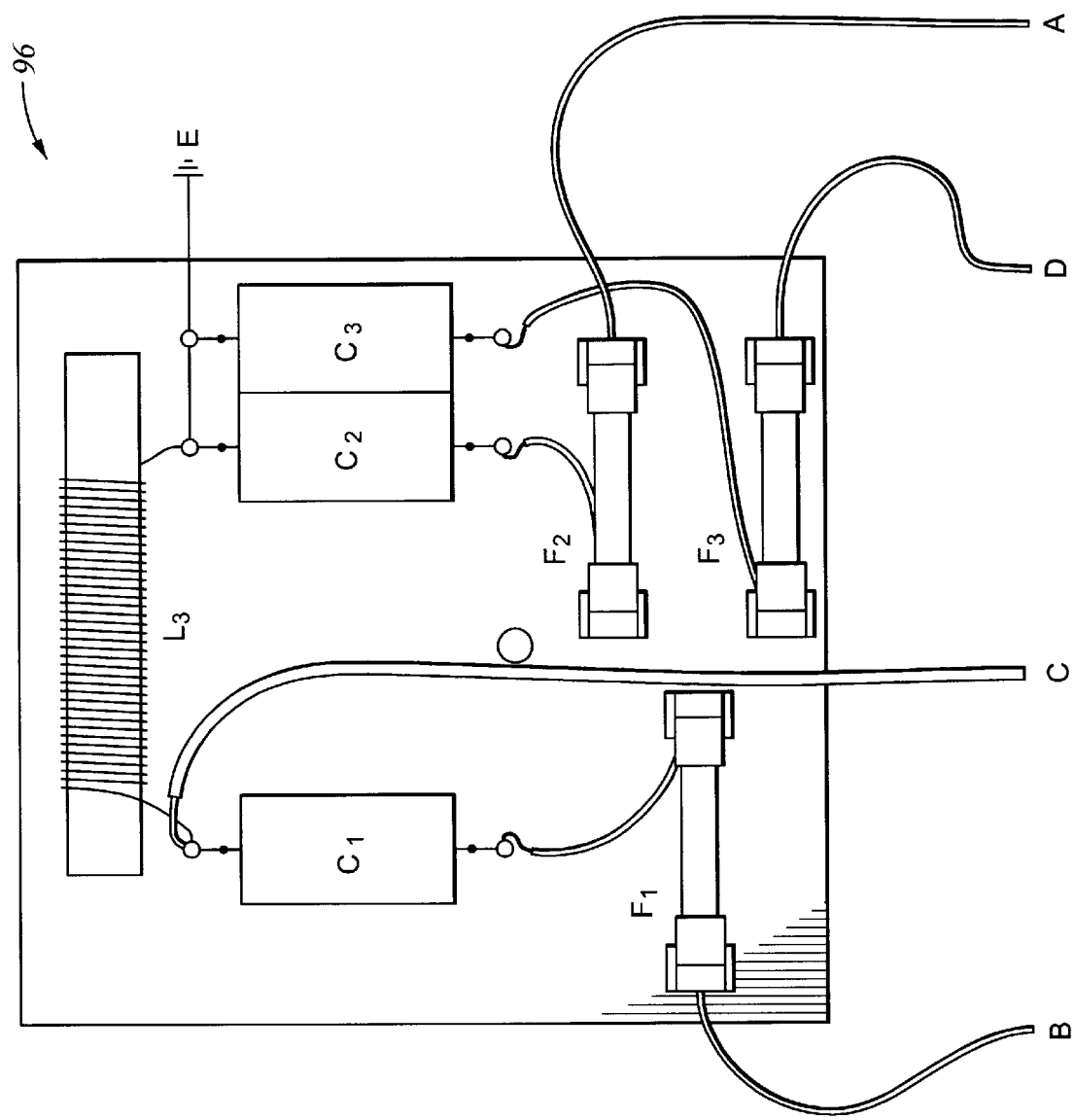
FIG. 9 is a view of a circuit board for the network conditioning unit of FIG. 8.

FIG. 9 shows a circuit board 96 which fits inside the unit 90 of FIG. 8 and houses the rest of the circuitry for the network conditioning unit of FIG. 7. Connections A, B, C, D and E are shown which connect to the appropriate points of the box shown in FIG. 8.

Figure 10:
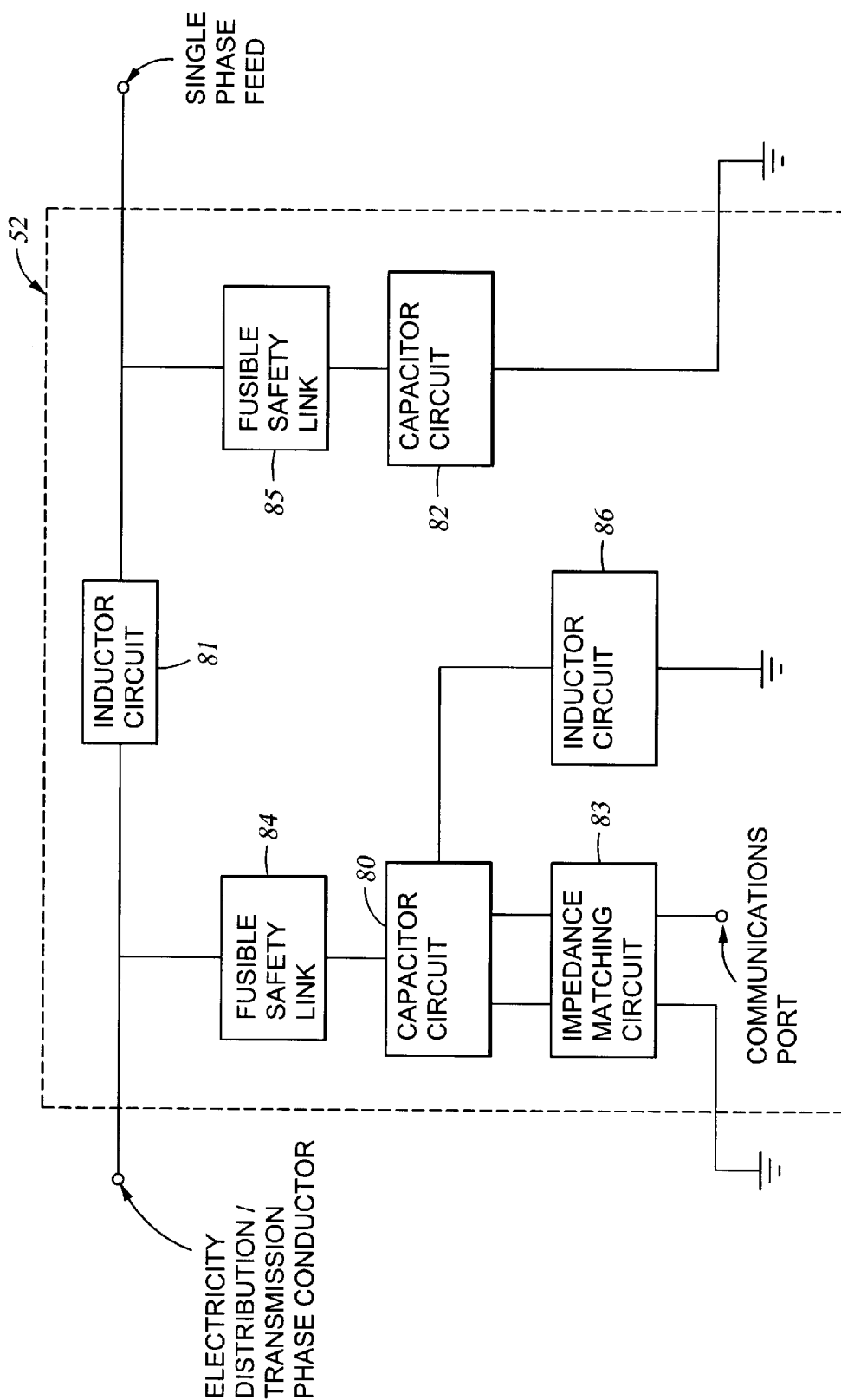
FIG. 10 is a schematic diagram of a network conditioning unit according to an aspect of the present invention.

FIG. 10 is a schematic representation of a network conditioning unit 52, showing the various building blocks 80–86 of the network conditioning element. To design a suitable network conditioning unit, the circuits represented by blocks 81 and 86 should be high-impedance elements over the required communications frequency spectrum (eg. 1 MHz and above) and low impedance elements at frequency of mains electricity supply (ie. 50/60 HZ) i.e. these elements are inductors. Similarly blocks 80 and 82 should be low impedance coupling elements over the required communications frequency spectrum and high impedance isolating elements at the frequency of the mains electricity supply ie. they are capacitors.

HRC fault current limiting fusible safety links (84 and 85) are provided in series with elements 80 and 82. An additional impedance matching network 83 may be included for connection to a communications port. This element may be external to the network conditioning unit 52.

The optimum values of items 81, 80, 82 and 86 will be dependent upon factors including:

a) The required frequency range over which the network is to be conditioned.
b) The unit length of the network which is to be conditioned.
c) The number and types of loads which may be encountered on the network.
d) The characteristic impedance of the network phase conductors with respect to earth ie. conductor outer electrical sheath.
e) The impedance of the communications interface devices.

The network conditioning unit may be filled with air, inert gas, resin compound or oil depending upon the location and load and/or fault current ratings of the conditioning unit. Also it may be, for example, sited indoors, pole mounted, buried underground or inserted in street lamp columns.

Similarly items 81 and 86 may comprise a number of individual inductors in series, and if no interconnection is required, for example, on a street light, items 84, 80, 83 and 86 may be omitted.

Items 80 and 82 may comprise a number of capacitors in series and/or parallel configuration depending upon working voltages encountered ie. 240, 415, 11 kV, 33 kV etc. Alternatively, or additionally, items 80 and 82 may comprise of two or more capacitors in parallel in order to overcome, for example, deficiencies in capacitor design when conditioning a network over a relatively wide frequency range, for example 50 MHZ to 500 MHZ.

Furthermore, items 81, 85 and 82 of the network conditioning unit may be cascaded if required. In a typical design, the greater the number of cascaded elements the sharper will be the roll off response of the filter and the greater its attenuation.

Figure 12A:
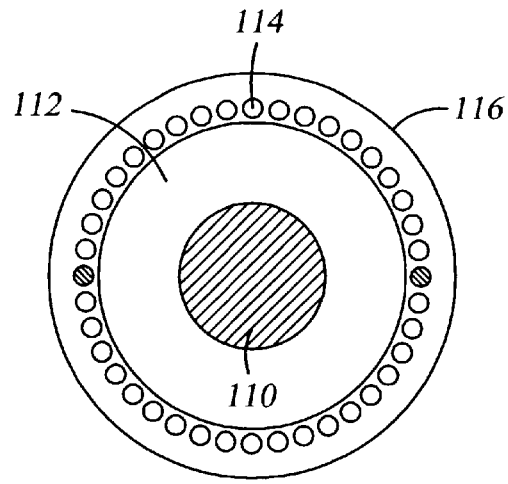
FIGS. 12A, 12B and 12C show sectional views through a concentric, split-concentric and pseudo-concentric cable respectively.
Figure 12B:
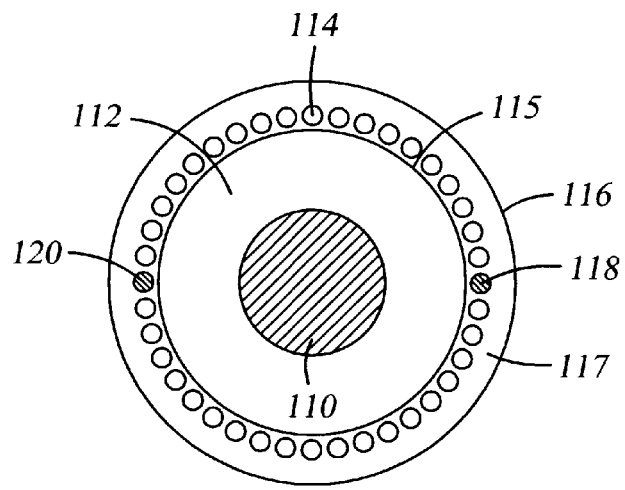
Figure 12C:
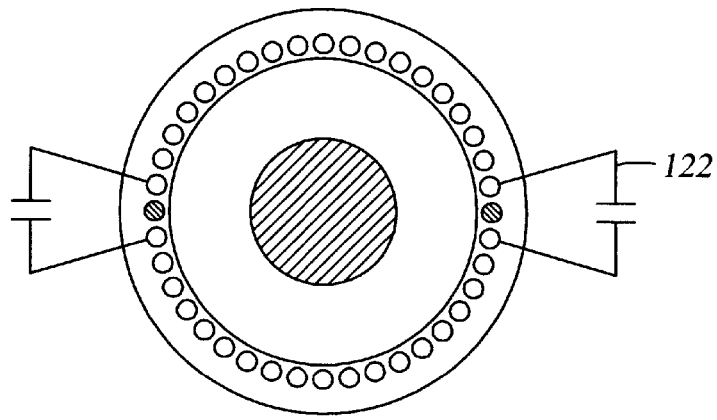

FIGS. 12A, 12B and 12C show sectional views through a single phase concentric, split-concentric and "pseudo"—concentric cables respectively. A typical concentric single phase cable (as illustrated in FIG. 12A) consists of a central metallic conductor core (typically aluminium) 110 surrounded by an insulating layer 112 (typically PVC). Around the insulating layer 112 are laid a plurality of metallic conductors 114 (typically copper) over which lies an insulating and protective sheath 116 (typically PVC). In use the neutral and earth are combined in the outer sheath of metallic conductors 114.

A split-concentric cable (as illustrated in FIG. 12B) is similar to the concentric cable except that the outer layer of metallic conductors 114 is split into two portions—e.g. an upper portion 115 and a lower portion 117. These portions are divided by insulators 118, 120 and in use the neutral and earth are split so that one portion of the outer metallic sheath carries only one of them.

In order to maintain a pseudo-coaxial effect in the split-concentric service cables at the desired transmission frequencies (e.g. above 1 MHz) one or more capacitors 122 may be connected between the upper and lower portions 115, 117 of the outer metallic sheath 114. These capacitors may be fitted e.g. at the termination and/or conditioning points of the cable.

It will be seen from the foregoing that the invention provides a simple filter effectively separating signals having a frequency spectrum indicative of radio communication signals from those of standard mains electricity power supply without significant loss of power or quality in either signal. Thus the electricity distribution and/or transmission network(s) can be used for both the provision of electricity supply and the propagation of telecommunications signals, which may be analogue and/or digital in format.

The use of a filter according to the invention at each consumer supply point in a low voltage electricity distribution network provides a conditioned network suitable for the transmission of high frequency communication signals together with the distribution of 50 Hz, 240v single and 415v, three phase electricity supplies. The provision of such a conditioned network constitutes a further aspect of the invention. The invention is not confined to the foregoing details and variations may be made thereto within the scope of the invention.

What is claimed is:

1. An electricity distribution and/or power transmission network at least part of which is external to a building, the network having a number of phase conductors, said number being chosen from the list 2,4,5,6,7,8,9, . . . n where n is an integer greater than 9, including input means for the input of a telecommunications signal having a carrier frequency greater than approximately 1 MHz onto at least one of the phase conductors of the network and output means for removing said telecommunications signal from at least one other phase conductor of the network, said signal being transmissible along said external part of the network, wherein the network is adapted to transmit said signal using frequency, time and/or code division multiplexing techniques.

2. A network according to claim 1 wherein the network is adapted to transmit said signal using Code Division Multiple Access (CDMA) communication techniques.

3. A network according to claim 1 wherein the network is adapted to transmit said signal using one or more of the following cordless telephony techniques:

R-CDMA (Rockwell-Code Division Multiple Access),
telephony standards CT0, CT1 and CT2, AMPS, DECT (Digital European Cordless Telephone Standard),
IS-54, IS-95, GSM, Q-CDMA, UD-PCS, PHS, PACS, TACS, ENTACS, NMT450, NMT900, C-450, RTMS, Radicom 2000, NTJ, JTACS & NTACS, DCS 1800.

4. A network according to claim 1, wherein the carrier frequency is between approximately 1–60 MHz.

5. A network according claim 1, wherein signal propagation is between at least one of the phase conductors of the network and earth.

6. An electricity distribution and/or power transmission network at least part of which is external to a building, the network having a number of phase conductors, said number being chosen from the list 2,4,5,6,7,8,9, . . . n where n is an integer greater than 9, including input means for the input of a telecommunications signal having a carrier frequency greater than approximately 1 MHz onto at least one of the phase conductors of the network and output means for removing said telecommunications signal from at least one other phase conductor of the network, said signal being transmissible along said external part of the network, wherein the network is adapted to transmit said signal using one or more of the following cordless telephony techniques:

R-CDMA (Rockwell-Code Division Multiple Access),
telephony standards CT0, CT1 and CT2, AMPS, DECT (Digital European Cordless Telephone Standard),
IS-54, IS-95, GSM, Q-CDMA, UD-PCS, PHS, PACS, TACS, ENTACS, NMT450, NMT900, C-450, RTMS, Radicom 2000, NTJ, JTACS & NTACS, DCS 1800;
wherein the carrier frequency is between approximately 1–60 MHz, and wherein signal propagation is between at least one of the phase conductors of the network and earth.

7. Communications apparatus adapted for use with a mains electricity transmission'on and/or distribution network, including signal transmission and/or reception means, and frequency conversion means for converting the frequency of a signal transmitted or received by signal transmission and/or reception means to a frequency which facilitates improved propagation of the signal on the network, wherein said signal transmission and/or reception means is adapted to operate according to a telephony standard which uses a relatively high carrier frequency, and said frequency conversion means is usable to convert a signal having a relatively high carrier frequency to a signal having a lower carrier frequency.

8. Communications apparatus according to claim 7, wherein said signal transmission and/or reception means is adapted to operate according to the CT2 or CDMA telephone standards.

9. Communications apparatus according to claim 7, wherein said frequency conversion means is usable to convert the carrier frequency of said signal to between 1 and 60 MHz.

10. Communications apparatus according to claim 7, wherein said signal transmission and/or reception means comprises telephone equipment.

11. Communications apparatus according to claim 7 connected to an electricity power distribution and/or transmission network.

12. Communications apparatus according to claim 7, wherein at least part of the network is external to a building, the network having a number of phase conductors, said number being chosen from the list 2,4,5,6,7,8,9, . . . n where n is an integer greater than 9, including input means for the input of a telecommunications signal having a carrier frequency greater than approximately 1 MHz onto at least one of the phase conductors of the network and output means for removing said telecommunications signal from at least one other phase conductor of the network, said signal being transmissible along said external part of the network, wherein the network is adapted to transmit said signal using frequency, time and/or code division multiplexing techniques.

13. A network according to claim 12 wherein the network is adapted to transmit said signal using Code Division Multiple Access (CDMA) communication techniques.

14. A network according to claim 12 wherein the network is adapted to transmit said signal using one or more of the following cordless telephony techniques:

R-CDMA (Rockwell-Code Division Multiple Access),
telephony standards CT0, CT1 and CT2, AMPS, DECT (Digital European Cordless Telephone Standard),
IS-54, IS-95, GSM, Q-CDMA, UD-PCS, PHS, PACS, TACS, ENTACS, NMT450, NMT900, C-450, RTMS, Radicom 2000, NTJ, JTACS & NTACS, DCS 1800.

15. A network according to claim 12, wherein the carrier frequency is between approximately 1–60 MHz.

16. A network according claim 12, wherein signal propagation is between at least one of the phase conductors of the network and earth.

17. Communications apparatus adapted for use with a mains electricity transmission and/or distribution network, including signal transmission and/or reception means, and frequency conversion means for converting the frequency of a signal transmitted or received by signal transmission and/or reception means to a frequency which facilitates improved propagation of the signal on the network, wherein said signal transmission and/or reception means is adapted to operate according to a telephony standard which uses a relatively high carrier frequency, and said frequency conversion means is usable to convert a signal having a relatively high carrier frequency to a signal having a lower carrier frequency, wherein said signal transmission and/or reception means is adapted to operate according to the CT2 or CDMA telephone standards, said frequency conversion means is usable to convert the carrier frequency of said signal to between 1 and 60 MHz, said signal transmission and/or reception means comprises telephone equipment, and said communications apparatus is connected to an electricity power distribution and/or transmission network, at least a portion of the network being external to a building, and said signal transmission means is adapted for transmission of said signal having a relatively high carrier frequency over said portion of the network external to said building according to the CT2 or DDMA telephone standards for reception by said reception means.

18. A network according to claim 17, wherein the network is adapted to transmit said signal over the portion of the network external to said building using one or more of the following cordless telephony techniques:

R-CDMA (Rockwell-Code Division Multiple Access),
telephony standards CT0, CT1 and CT2, AMPS, DECT (Digital European Cordless Telephone Standard),
IS-54, IS-95, GSM, Q-CDMA, UD-PCS, PHS, PACS, TACS, ENTACS, NMT450, NMT900, C-450, RTMS, Radicom 2000, NTJ, JTACS & NTACS, DCS 1800.

19. Use of a communications apparatus with an electricity distribution and/or power transmission network, the apparatus including signal transmission and/or reception means, and frequency conversion means for converting the frequency of a signal transmitted or received by signal transmission and/or reception means to a frequency which facilitates improved propagation of the signal on the network, wherein said signal transmission and/or reception means operates according to a telephony standard which uses a relatively high carrier frequency, and said frequency conversion means converts a signal having a relatively high carrier frequency to a signal having a lower carrier frequency.

20. A method of signal transmission including:

inputting a telecommunications signal having a carrier frequency of greater than approximately 1 MHz onto a first phase conductor of an electricity power distribution and/or transmission network at least part of which is external to a building; and subsequently receiving the signal from a second phase conductor of the network;

said signal being transmitted along said external part of the network, wherein said signal is transmitted using frequency, time and/or code division multiplexing techniques.

21. Use of telecommunications apparatus for transmission or reception of a telecommunications signal having a carrier frequency greater than approximately 1 MHz on an electricity distribution and/or power transmission network at least part of which is external to a building, the network having a number of phase conductors, said number being chosen from the list 2,4,5,6,7,8,9,... n (where n is an integer greater than 9), including input of a telecommunications signal having a carrier frequency greater than approximately 1 MHz onto at least one of the phase conductors of the network and removing said telecommunications signal from at least one other phase conductor of the network, and said signal being transmitted along said external part of the network using frequency, time and/or code division multiplexing techniques.

22. Use of telecommunications apparatus as claimed in claim 21, wherein said signal is transmitted along said external part of the network using Code Division Multiple Access (CDMA) communication techniques.

23. Use of telecommunications apparatus as claimed in claim 21, wherein said signal is transmitted along said external part of the network using one or more of the following cordless telephony techniques:

R-CDMA (Rockwell-Code Division Multiple Access), telephony standards CT0, CT1 and CT2, AMPS, DECT (Digital European Cordless Telephone Standard),

IS-54, IS-95, GSM, Q-CDMA, UD-PCS, PHS, PACS,

TACS, ENTACS, NMT450, NMT900, C-450, RTMS,

Radicom 2000, NTJ, JTACS & NTACS, DCS 1800.

24. Use of telecommunications apparatus as claimed in claim 21, wherein said signal is transmitted along said external part of the network using a carrier frequency between approximately 1–60 MHz.

25. Use of telecommunications apparatus as claimed in claim 21, wherein said signal is propagated between at least one of the phase conductors of the network and earth.

* * * * *

(12) EX PARTE REEXAMINATION CERTIFICATE (8635th)
United States Patent
Brown

(10) Number: US 6,144,292 C1
(45) Certificate Issued: *Oct. 25, 2011

(54) POWERLINE COMMUNICATIONS NETWORK EMPLOYING TDMA, FDMA AND/OR CDMA

(75) Inventor: Paul A. Brown, Cumbria (GB)

(73) Assignee: Amperion, Inc., Andover, MA (US)

Reexamination Request:
No. 90/011,094, Jul. 15, 2010

Reexamination Certificate for:
Patent No.: 6,144,292
Issued: Nov. 7, 2000
Appl. No.: 08/727,530
Filed: Oct. 21, 1996

(*) Notice: This patent is subject to a terminal disclaimer.

(22) PCT Filed: Apr. 20, 1995

(86) PCT No.: PCT/GB95/00894
§ 371 (c)(1),
(2), (4) Date: Dec. 9, 1996

(87) PCT Pub. No.: WO95/29537
PCT Pub. Date: Nov. 2, 1995

Related U.S. Application Data

(63) Continuation-in-part of application No. 08/347,427, filed as application No. PCT/GB93/02163 on Oct. 20, 1993, now Pat. No. 5,684,450.

(30) Foreign Application Priority Data

Oct. 22, 1992 (GB) ............................................. 9222205
Apr. 21, 1994 (GB) ............................................. 9407934

(51) Int. Cl.
*H02J 13/00* (2006.01)
*H04B 3/56* (2006.01)
*H04B 3/54* (2006.01)

(52) U.S. Cl. ............................ 340/310.02; 340/12.33; 340/310.12; 370/466; 370/478; 370/479; 370/487; 370/214

(58) Field of Classification Search ........................ None
See application file for complete search history.

(56) References Cited

U.S. PATENT DOCUMENTS 5,467,011 A  11/1995  Hunt

OTHER PUBLICATIONS

E.F. Hasler, R.E. Martin, and F.D. Pullen, *Communication Systems using Bundle Conductor Overhead Power Lines*, (Mar./Apr. 1975), IEEE Transactions on Power Apparatus and Systems, vol. PAS–94, No. 2.

*Primary Examiner* — John M Hotaling, II

(57) ABSTRACT

A communicatons apparatus is adapted for use with a mains electricity transmission and/or distribution network. The communications apparatus includes a signal transmission and/or reception means, and frequency conversion means for converting the frequency of a signal transmitted or received by the signal transmission and/or reception means to a frequency which facilitates improved propagation of the signal on the network. Preferably the signal transmission and/or reception means is adapted to operate according to a telephony standard with uses a relatively high carrier frequency (e.g. CT2), and the frequency conversion means is usable to covert a signal having a relatively high carrier frequency (e.g. CT2) and the frequency conversion means is usable to convert a signal having a relatively high carrier frequency to a signal having a lower carrier frequency.

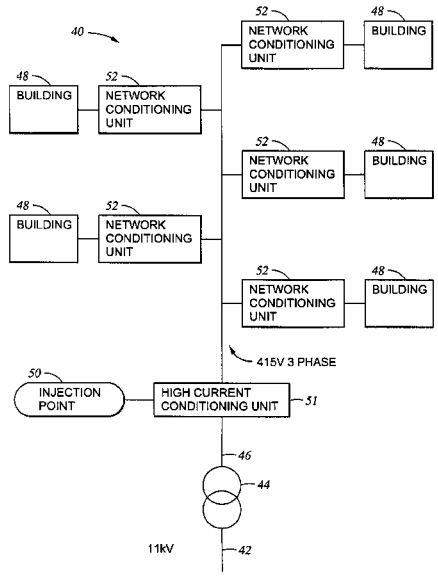

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 4, 5, 20, 21, 24 and 25 is confirmed.

Claims 2, 3, 6-19, 22 and 23 were not reexamined.

* * * * *